United States Patent [19]
Reddy et al.

[11] Patent Number: 5,818,654
[45] Date of Patent: Oct. 6, 1998

[54] APPARATUS AND PROCESS FOR MANAGING DEFECTIVE HEADERLESS SECTORS

[75] Inventors: Prafulla B. Reddy, Santa Cruz, Calif.; Jimmie R. Shaver, Yukon, Okla.; Sean R. Atsatt, Santa Cruz, Calif.; Mark H. Groo, Boulder Creek, Calif.; Timothy V. Gates, Sunnyvale, Calif.; William K. Weberg, Los Gatos, Calif.

[73] Assignee: Seagate Technology, Inc., Scotts Valley, Calif.

[21] Appl. No.: 869,041

[22] Filed: Jun. 4, 1997

Related U.S. Application Data

[63] Continuation of Ser. No. 476,265, Jun. 7, 1995, abandoned, which is a continuation-in-part of Ser. No. 259,303, Jun. 13, 1994, abandoned.

[51] Int. Cl.$^6$ ................................ G11B 5/09; G11B 5/596
[52] U.S. Cl. ................................ 360/53; 360/48; 360/49; 360/51; 360/77.08
[58] Field of Search ................................ 360/48, 49, 51, 360/53, 77.08

[56] References Cited

U.S. PATENT DOCUMENTS

| | | | |
|---|---|---|---|
| 4,405,952 | 9/1983 | Slakmon | 360/49 |
| 4,558,446 | 12/1985 | Banba et al. | 371/10 |
| 4,656,532 | 4/1987 | Greenberg et al. | 360/48 |
| 4,792,917 | 12/1988 | Takamatsu et al. | 364/900 |
| 4,918,651 | 4/1990 | Bonke | 364/900 |
| 4,986,668 | 1/1991 | Fukushima et al. | 360/49 |
| 5,253,131 | 10/1993 | Chevalier | 360/78.14 |
| 5,274,509 | 12/1993 | Buch | 360/48 |
| 5,438,559 | 8/1995 | Best et al. | 369/54 |
| 5,455,721 | 10/1995 | Nemazie et al. | 360/51 |
| 5,500,848 | 3/1996 | Best et al. | 369/275.3 |
| 5,523,903 | 6/1996 | Hetzler et al. | 360/51 |

OTHER PUBLICATIONS

"2½–inch 270, 344, 405, 540 and 810MB Disk Drives", IBM Fast Fax #1053, May 1994.

*Primary Examiner*—Aristotelis M. Psitos
*Assistant Examiner*—Regina Y. Neal
*Attorney, Agent, or Firm*—Kinney & Lange, P.A.

[57] ABSTRACT

A memory medium has a plurality of tracks arranged in a plurality of sectors with each track sector having a format which does not include header fields identifying sectors or sector defects or defect management procedures. Track management apparatus identifies the track sector currently confronting a transducer; the track management being based on sector pulses (in the case of a dedicated servo system), or being calculated based on track information, an index pulse and data wedge information from previous wedges (in the case of embedded servo systems), or being derived from a lookup table. To accommodate sector defects, a defect bank contains the identity and type of each defective or spare sector. Defect management apparatus is connected to the defect bank and track management apparatus to indicate when the sector confronting the transducer is a defective or spare sector to halt data transfer to thereby skip the defective sector, or to generate an interrupt signal to the processor to transfer data between the processor and an alternate sector.

30 Claims, 19 Drawing Sheets

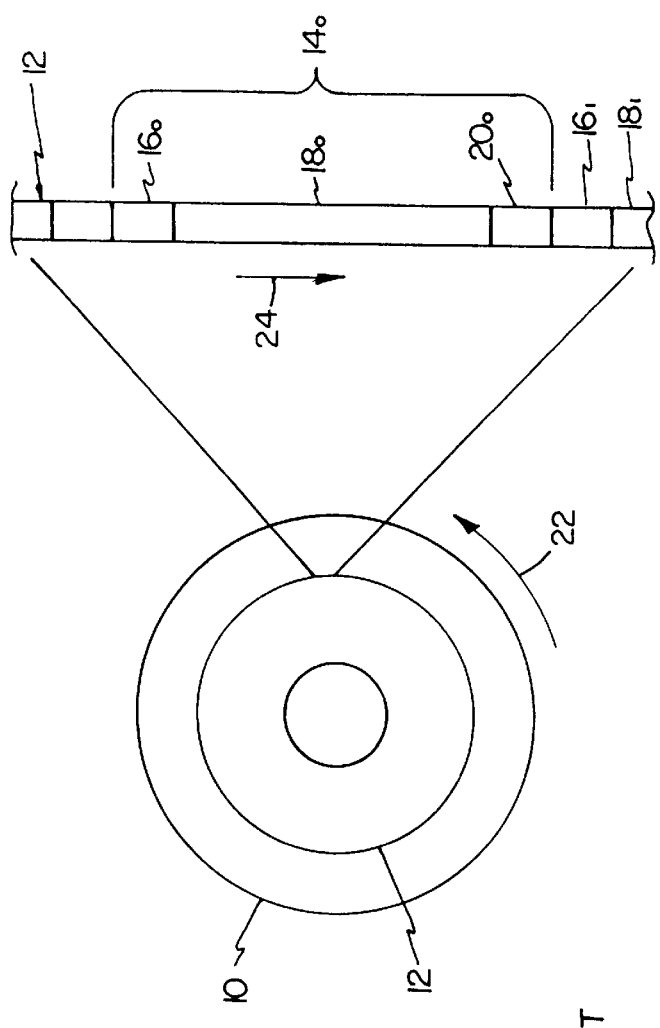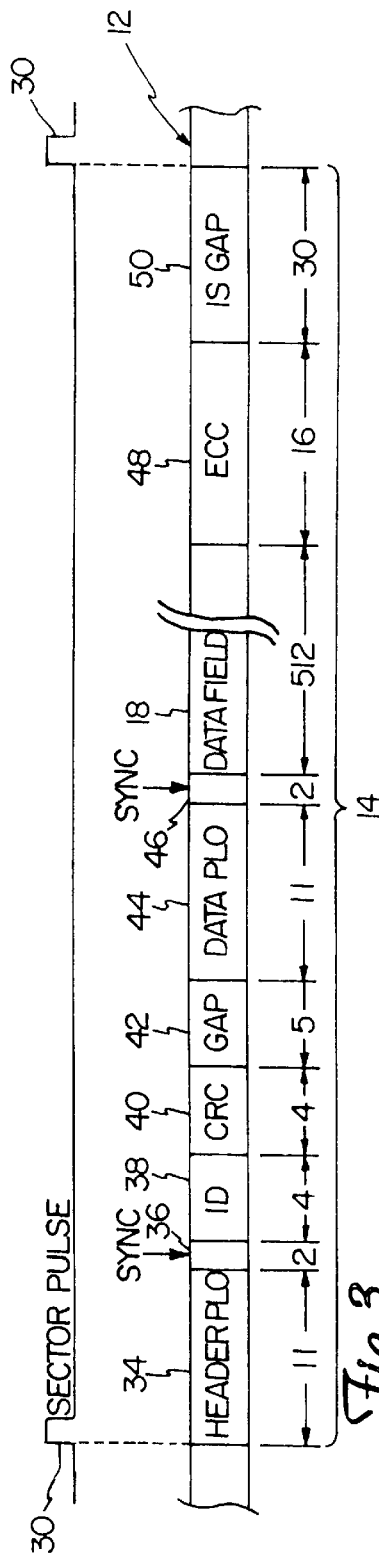

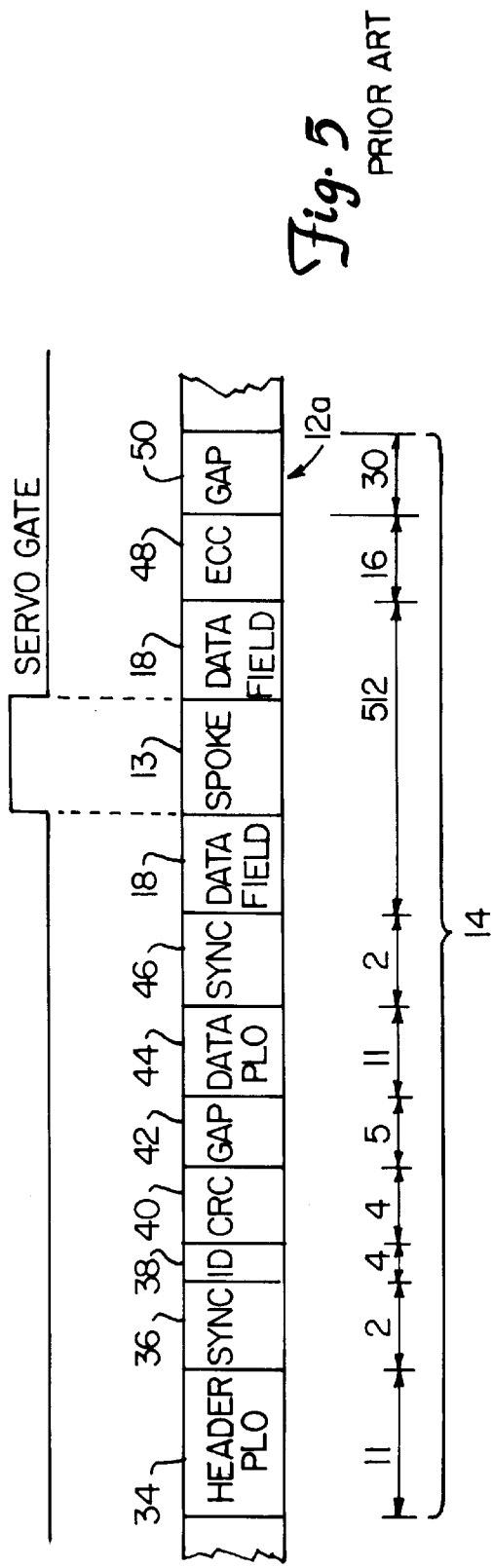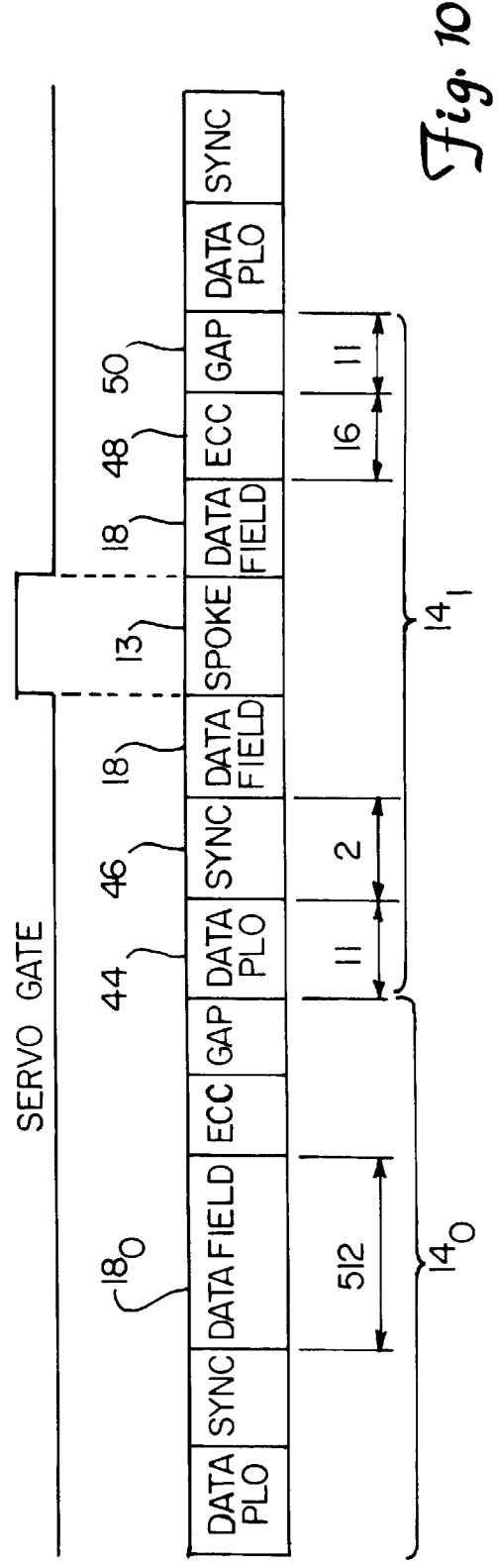

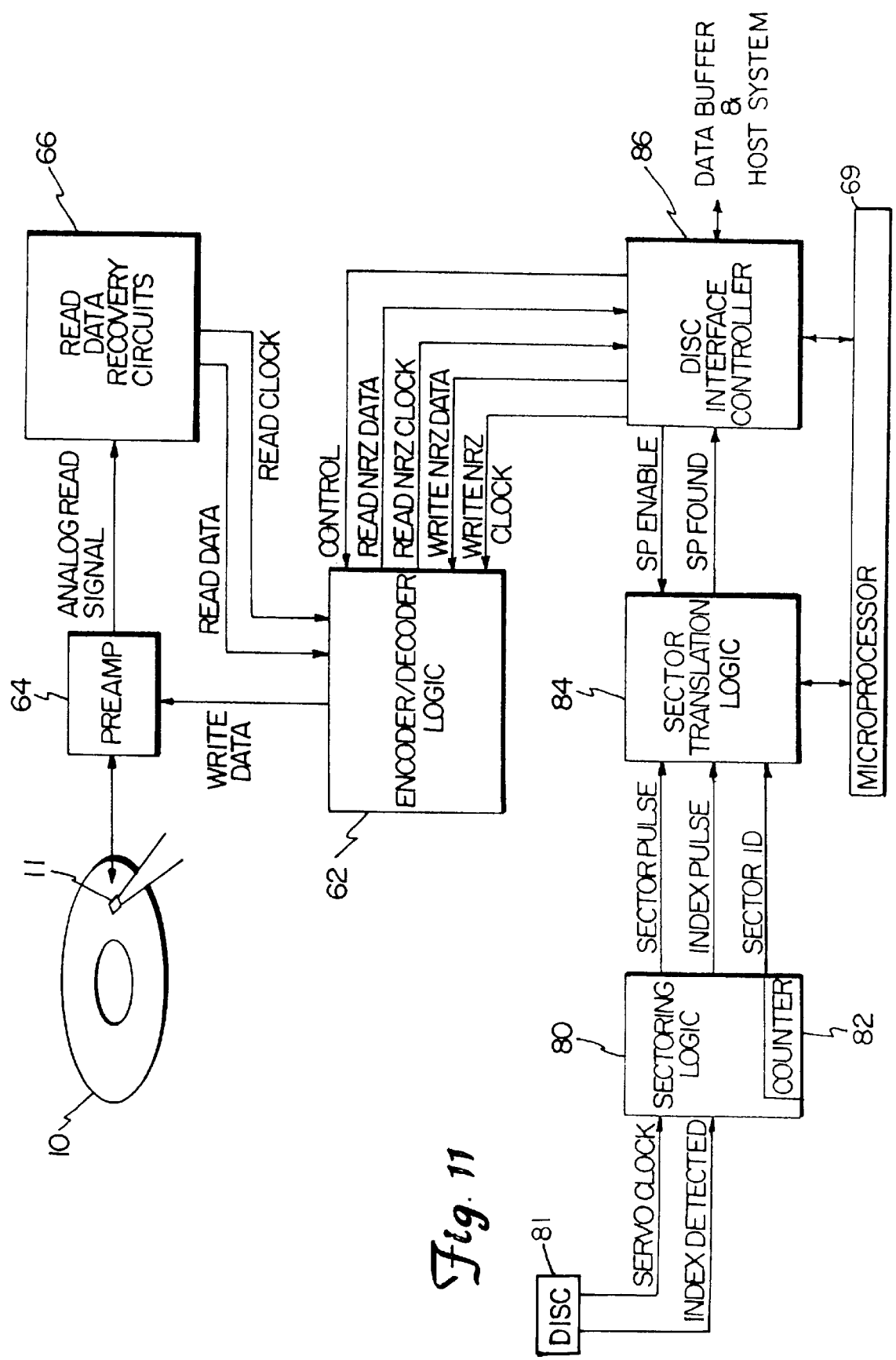

| RESER (6) | LAST FRAGMENT SPLIT DESCRIPTOR (10) | LAST FRAGMENT COUNT (4) | STARTING PHYSICAL BLOCK DISPLACEMENT (12) |
|---|---|---|---|
| | | | |

*Fig. 23*

| RESER (10) | STATUS (1) | ZONE (5) | RESER (1) | SLIP (15) | LOGICAL BLOCK ADDRESS (32) |
|---|---|---|---|---|---|
| | | | | | |

*Fig. 24*

APPARATUS AND PROCESS FOR MANAGING DEFECTIVE HEADERLESS SECTORS

RELATION TO OTHER APPLICATIONS

This is a continuation of application Ser. No. 08/476,265, filed Jun. 7, 1995, now abandoned, which in turn is a continuation-in-part of application Ser. No. 08/259,303, filed Jun. 13, 1994, now abandoned.

BACKGROUND OF THE INVENTION

This invention relates to identifying sectors in data tracks without the use of sector headers, and to identifying defective sectors in concentric data tracks on a disc and interrupting data transfer to and from such defective sectors. The present invention also is directed to a headerless track sector format.

In computer systems, data storage equipment employ media having tracks, adjacent to which one or more transducing heads is positioned to read data from and write data to the track. One common such storage device is a magnetic disc drive which employs a magnetic medium having plural concentric tracks. In many magnetic disc drives, particularly those employing hard or rigid discs, the disc tracks are divided into sectors, with each sector having a format employing header fields which precede the data field. Ordinarily the data field in each sector has the same number of bytes as every other sector. Hence, the sectors are of substantially equal length.

Tracks at inner radii of the disc have shorter physical lengths than tracks at outer radii of the disc. It is common to employ different recording frequencies in different radial zones of the disc. This technique, called zone bit recording, permits the physical size of the sectors, and hence the bit density, to be substantially the same over the entire disc surface. Consequently, inner tracks contain fewer sectors than outer sectors. Nevertheless, in a hard sectored disc drive, the layout of the tracks is the same for all tracks in a given recording zone, but different between zones. Also, it is common to employ a "runt" sector at the end of each track that contains fewer bytes than data sectors and typically contains no useful information. These "runt" sectors are present only to occupy excess space in the track.

In a typical disc drive, the header provides information to the disc interface controller concerning the logical data which are stored in the corresponding data field. The header also provides information indicating whether there is a known defect in the sector and what type of defect management has been or is to be used to bypass the defect. More particularly, the sector header indicates the existence of a sector defect, so that data in the data field of the sector are ignored or that data are not written into the sector. The sector management instructions indicate that data are to be read from or written into the next successive sector (if not defective) or from or to some alternate track and sector. The alternate track and sector location is usually provided by the microprocessor, as is well known in the art.

In prior hard disc systems, the sector format includes a header having a header field for sector addressing and defect management followed by a cyclic redundancy checking code (which is a limited error detection code) in a CRC field. The data field follows the CRC field and is protected against errors by a powerful error detection and correction code stored in a trailing ECC field. Most disc drives employ specific software and hardware to quickly correct errors detected in the data field by the ECC with minimal latency. However, errors in the header field are not immediately corrected; a minimum of one disc revolution latency is required before an attempt to re-read the header field can be performed. It has been suggested to add software and hardware to correct header field errors with minimal latency, but such hardware must be very fast and therefore large and expensive to correct errors before the data field is read by the read/write head. Inevitably, header error correction hardware adds to the format overhead, since additional code information must be stored on a medium. Also a larger gap would be required between the header and data PLO field. This added format overhead diminishes the capacity and performance of the disc drive.

Disc drives employ servo systems that control the position of the read/write heads relative to the disc. A dedicated servo system employs a separate disc surface containing servo data for the other disc surfaces of the drive. Typically, a disc stack containing a plurality of discs is employed in the drive so that user data may be recorded on several disc surfaces under the control of servo data on one of the disc surfaces. In an embedded servo system, the servo data is written on the same disc surface as the user data. Radial "spokes" appear at regular intervals on the disc and contain the servo data. The region between spokes, called the logical wedge, contains one or several sectors or partial sectors. Often a sector is divided by a spoke, usually in the data field of the sector.

The format efficiency of a disc drive is defined as the number of bytes available to store user data in the data fields divided by the number of bytes in the entire disc surface, and is given by the following relationship:

$$\text{format efficiency} = \frac{\text{number of data field bytes}}{\text{number of data field bytes} + \text{format overhead}}$$

The number of bytes in the data field is equal in all sectors which contain user data. The format overhead includes all the bytes other than in the data field, such as the header PLO, synchronization pattern, identification data, CRC, data PLO, ECC, various gaps and the runt sector. The format overhead also includes the spokes in the case of the embedded servo system. A typical data field contains 512 bytes. The format efficiency typically ranges between 80 and 87% for discs formatted for dedicated servo systems, depending on read/write frequencies, types of heads and read channel circuitry and relative size of the error detection and correction codes. The format efficiency typically ranges between 70 and 85% for discs formatted for embedded servo systems.

One difficulty associated with hard disc drives is that as recording frequencies increase and new recording technologies are utilized, the media overhead associated with the headers increases and the format efficiency decreases. There is, accordingly, a growing need for a sector format in which the format overhead is decreased.

SUMMARY OF THE INVENTION

A disc drive according to one aspect of the present invention includes a rotatable disc having a plurality of concentric data tracks arranged in a plurality of sectors and characterized by an absence of sector identification and sector defect data. A transducer confronts the disc and is operable to transfer data between a sector of the track confronting the disc and a processor. Track management apparatus identifies the sector currently confronting the disc and includes a bound identification apparatus for identifying sectors on the track and sector identification apparatus to identify the sector currently confronting the transducer.

In one form of the invention, the track management apparatus includes a servo disc providing index and servo clock signals identifying the start of a track. The sectors are identified by generating sector pulses from the servo clock signal. Sector logic identifies the sector currently confronting the transducer, preferably using a counter to generate an address or other identification of the sector confronting the transducer.

In another form of the invention, the track management apparatus includes servo spokes on the disc providing index pulses identifying the start of a track, each spoke identifying a data wedge containing a plurality of sectors. Based on the number of wedges in the track, the layout of the first wedge can be performed based on the index pulse and the size of the wedge. The layout of successive data wedges is based on the wedge number and the layout of the next prior wedge.

In another form of the invention, the track management apparatus includes a lookup table containing layouts of sectors of tracks on the disc.

A disc drive according to another aspect of the present invention includes a rotatable disc having a plurality of concentric data tracks each arranged in a plurality of sectors. A transducer confronts tracks on the disc and operates to transfer data between a track sector on the medium confronting the transducer and a processor. Track management apparatus identifies the sector currently confronting the transducer, and defect management apparatus includes a defect bank identifying defective sectors. Data transfer between the medium and the processor is inhibited when the sector identified by the track management apparatus corresponds to a defective sector identified by the defect management apparatus.

In one form of the invention, the track management apparatus includes a servo disc providing index signals identifying the start of a track and servo clock signals. Sector logic identifies the sector currently confronting the transducer and translation logic determines if the sector confronting the transducer matches a defective sector. The translation logic includes a defect bank containing information representative of the identification of defective sectors in at least the track currently confronting the transducer, and a state machine connected to the defect bank and sector logic. Preferably, the state machine operates to skip the defective sector or generate the interrupt signal to the processor.

In this form of the invention, the defect bank preferably has a plurality of addressable locations and is large enough to hold a defect list for at least two tracks. A defect pointer counter points to an address in the defect bank and is incremented by the state machine to address successive locations in the defect bank. A defect list start register may contain an address in the defect bank identifying the start of the list of defective sectors, and a defect list end register may contain an address in the defect bank identifying the end of the list of defective sectors. Also preferably, a search sector counter contains an identification of a sector of the medium with which data are to be transferred. The state machine compares the found sector to the defect list, and if the search logic number is equal to a defective sector number, skips the defective sector or issues the interrupt. If the search logic number is not equal to a defective sector number, compare logic connected to the search sector counter and the sector logic matches the identification of a sector of the medium with which data are to be transferred with the identification of the sector currently confronting the transducer to indicate the sector has been found.

Preferably, the defect bank contains defect management data associated with identified defective sectors. The defect management data include a status bit indicative of a reassigned or skipped condition. The apparatus responds to the skipped condition to initiate transfer of data with the next successive sector on the track and responds to the reassigned condition to interrupt the processor. The processor responds to the interrupt to identify an alternate track and track sector for transfer of data.

In another form of the invention, the track management apparatus includes servo spokes on the disc providing index pulses identifying the start of a track, each spoke identifying a data wedge containing a plurality of sectors. The layout of the data wedges is calculated on the basis of the index pulse and the size and number of the wedge. A defect bank includes a plurality of addressable locations and a search sector counter contains an identification of a sector of the medium with which data are to be transferred. A defect pointer counter contains an address of a location in the defect bank. The defect management apparatus increments the defect pointer counter to address successive locations in the defect bank. When a match occurs between the identification of the sector currently confronting the transducer and the defect identification addressed by the defect pointer counter, data transfer with the sector confronting the transducer is inhibited. The defect bank may include the reassigned or skipped status bit described above.

In another form of the invention, the defect bank may comprise data representing a defective sector or range of defective sectors to indicate the location of the next good sector.

Another aspect of the present invention resides in the provision of a memory medium having a plurality of tracks arranged in a plurality of sectors with each track sector having a format which consists essentially of the data frequency field, a synchronization field, a data field and a data error correction field. The format may further include an intersector gap. The header fields, traditionally employed in track sectors for sector addressing and for defect identification and management, are omitted and replaced by the defect identification and management data in the defect bank. In one form of the medium, the tracks are formatted for use with dedicated servo systems where servo data for the tracks is maintained on a separate servo disc surface. In another form of the medium, the tracks are formatted for use with embedded servo systems where servo data is written into servo spokes, separated by data wedges on each track, each data wedge containing a plurality of data fields or data field fragments. In both forms of the media, the track is characterized by an absence of sector identifications and defect data.

BRIEF DESCRIPTION OF THE DRAWINGS

FIG. 1 illustrates a typical hard disc format for sectors on a data track of a magnetic disc of a disc drive having a dedicated servo system.

FIG. 3 illustrates a typical sector format for a track of a disc drive having a dedicated servo system according to a prior art format.

FIG. 5 illustrates a typical sector format of an embedded servo track sector according to a prior art format.

FIG. 10 illustrates a sector format for a headerless format for a disc used with an embedded servo system according to the present invention.

FIG. 11 is a block diagram of a read/write system for a disc drive employing the format of FIG. 9.

FIG. 23 illustrates the layout of the track description table employed in the apparatus shown in FIG. 22.

FIG. 24 illustrates the layout of a defect description table employed in the apparatus shown in FIG. 22.

DETAILED DESCRIPTION OF THE PREFERRED EMBODIMENTS

Figure 2:
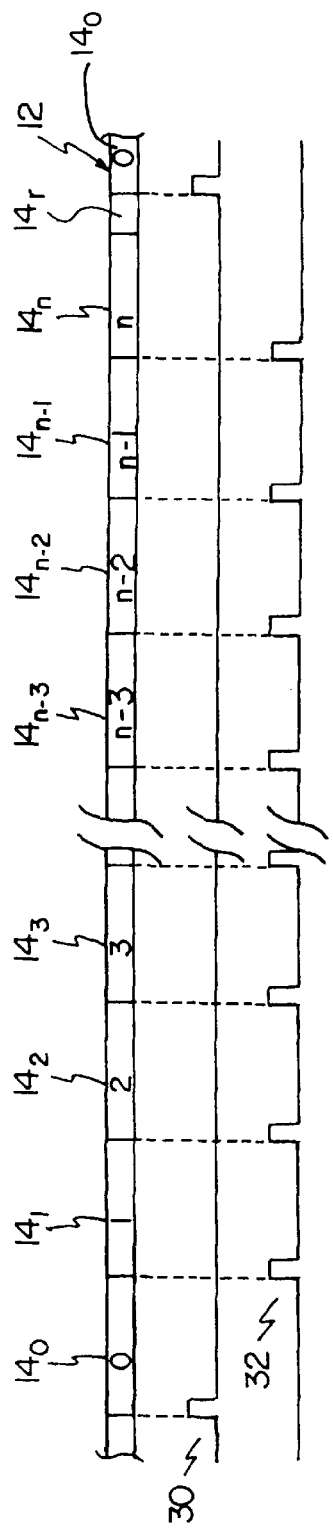
FIG. 2 illustrates a layout of sectors on a disc used with a dedicated servo system, identifying index and sector pulses marking the track and sectors thereon.

FIG. 1 illustrates a typical hard disc 10 having a plurality of concentric data tracks, one of which is data track 12. The hard disc 10 is one of a stack of discs, one of the discs having a surface containing servo information. Thus, disc 10 illustrated in FIG. 1 is a data disc of a disc drive having a dedicated servo system. Each data track contains a plurality of successive sectors, such as sector $14_0$. Sector $14_0$ includes a header $16_0$ data field $18_0$ and intersector gap $20_0$. Disc 10 rotates in the direction of arrow 22 past a read/write head or transducer (not shown in FIG. 1) so that relative movement of the head to track 12 is in the direction of arrow 24. Hence the head first encounters header $16_0$, then data field $18_0$, and lastly intersector gap $20_0$. As shown particularly in FIG. 2, the track 12 is laid out with successive sectors, $14_0, 14_1, 14_2 \ldots 14_n$ with the first sector $14_0$ being identified by an index pulse 30 and the remaining sectors on the track being identified by a sector pulse 32. A "runt" sector $14_r$ is located between the sectors $14_n$ and $14_0$.

FIG. 3 illustrates the format of a typical sector outlined by sector pulse 30. As shown in FIG. 3, the format includes an 11-byte header PLO field 34, a 2-byte synchronization pattern 36, a 4-byte identification field 38, a 4-byte CRC field 40, a 5-byte pad and tolerance gap 42, an 11-byte data PLO field 44 and an additional 2-byte synchronization pattern 46 preceding the 512-byte data field 18. Following data field 18 is a 16-byte error detection and correction code field 48, followed by an intersector gap field 50, typically having 30 bytes. Following the intersector gap 50 of sector 14 is the header PLO field 34 of the next sector.

Header information is provided in the ID field 38 and includes identification of the sector, an indicator of whether a defect exists in the sector, and an indicator of the defect management steps to be taken if the sector is defective. More particularly, defect management may take the form of either (1) skipping the defective sector so that data are read from or written to the next successive sector on the track (if not defective), or (2) interrupting the processor to initiate a read or write operation with a different sector on the same or another track. Errors in the header information are detected by the 4-byte cyclic redundancy checking code in CRC field 40. User data are stored in the 512-byte data field 18, and an error detection and correction code in ECC field 48 is used to detect and correct errors in data. The header and data PLO fields 34 and 44 provide clock data to phase locked loops of the recovery circuits (not shown) to synchronize information recovery from the sector ID and data fields 38 and 18. Sync fields 36 and 46 identify the start of the ID data and user data fields. A 5-byte tolerance gap 42 permits the recovery circuits ample time to switch from the header to the data mode, while 30-byte intersector gap 50 accommodates recovery of write to read operations at the end of each sector as well as the switch from data to header.

It will be appreciated from an inspection of FIG. 3 that of the 597 bytes in sector 14, 85 of those bytes are devoted to format overhead. For a track containing 111,110 bytes divided into 186 sectors, 95,232 bytes are devoted to the data fields and the remaining 15,878 bytes are devoted to format overhead. Therefore, the format efficiency is 85.7%.

Figure 4:
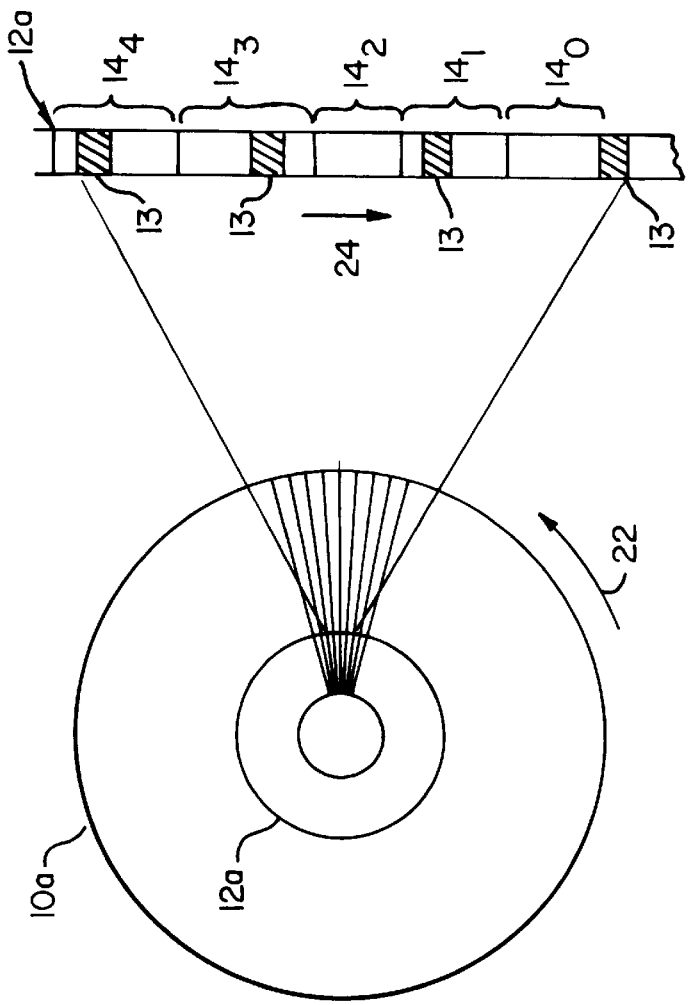
FIG. 4 illustrates a typical format for sectors on a data track of a magnetic disc of a disc drive having an embedded servo system.

FIG. 4 illustrates a typical hard disc $10a$ of a disc drive having an embedded servo system. Disc $10a$ has a plurality of concentric data tracks, one of which is data track $12a$. Each data track contains a plurality of successive sectors, such as sector $14_0$–$14_n$. Like the sectors of the disc used with the dedicated servo system of FIGS. 1–3, sectors 14 of the disc used with the embedded servo system include a header, data field and intersector gap. Disc 10 rotates in the direction of arrow 22 past a read/write head or transducer (not shown in FIG. 4) so that relative movement of the head to track $12a$ is in the direction of arrow 24. As shown particularly in FIG. 5, track $12a$ is laid out with successive sectors, $14_0, 14_1, 14_2 \ldots 14_n$ with the first sector $14_0$ being identified by an index pulse 30 and the remaining sectors on the track being identified by a sector pulse 32. A "runt" sector may be located at the end of the track.

Figure 6:
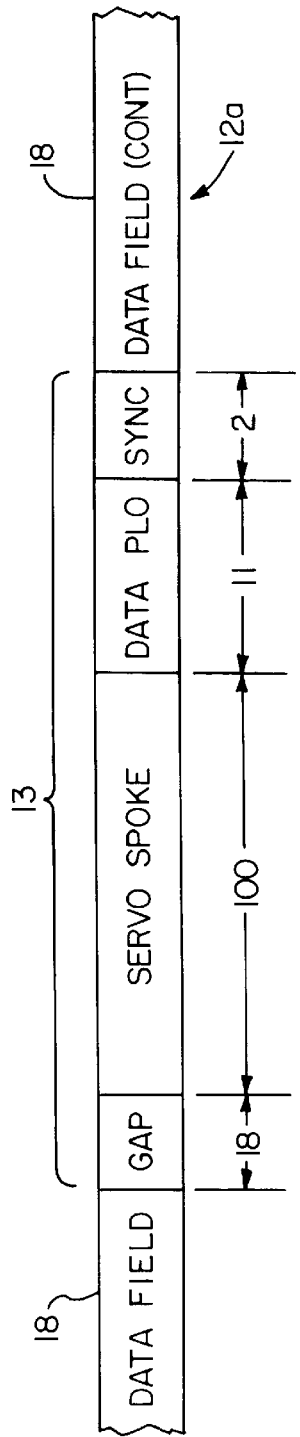
FIG. 6 illustrates the servo spoke in a sector shown in FIG. 5.

Disc $10a$ includes a plurality of spokes 13 containing servo data. The spokes are located at regularly spaced intervals at fixed angular positions around the disc. The spokes intersect the tracks as shown. Usually but not always, a spoke intersects a sector within the data field, as shown in FIG. 5. Typically, a sector can only be split in a data field or in a large fraction of a data field. The other fields, including the ECC, PLO and header fields, usually cannot be split. As shown in FIG. 6, the servo data within spoke 13 is preceded by a gap of 18 bytes and is followed by a PLO field comprising 11 bytes and synchronization data of 2 bytes.

The servo spoke is usually recorded at a lower frequency than the data in the sectors, and typically contains some or all of a synchronization field, an automatic gain control field, track identification in grey code, servo number and head number (where multiple heads confront the disc surface), and analog track centering data. Typically, the spoke occupies space equivalent to 10 to 15 microseconds. For example, a disc drive having a servo spoke of 10 microseconds and a data frequency of 80 MHz will have a spoke width equivalent to 100 bytes of data.

For a track having 111,110 bytes divided into 60 spokes and 172 sectors, 88064 bytes are devoted to the data field and the remaining 23046 bytes are devoted to format overhead. Therefore, the format efficiency is about 79.2%.

For disc drives having separate read and write head components, such as magnetoresistive (MR) heads, it is often necessary to format with two headers per sector to accommodate the radial skew between the read and write heads. One header, radially aligned with the data field, is used for reading data from the sector while the other header, which is radially offset from the data field to compensate for skew of the write head to the read head, is used for writing data to the sector. The offset or write header consists of a header PLO field, synchronization pattern, identification field, CRC field and an additional tolerance gap separating it from the read or non-offset header. The offset header is usually between the aligned header and data fields (see U.S. Pat. No. 5,257,149 to Meyer, assigned to the same assignee as the present invention). The 26 bytes required by the offset header increase the format overhead to 111 bytes and the overall sector to 623 bytes, reducing the dedicated servo format efficiency to 82.0% (with 178 sectors per track) and the embedded servo format efficiency to 76.0% (with 165 sectors per track). Hence, the single header format requires the header occupy more than 4.3% of the disc real estate, whereas the dual header format requires sector headers to occupy more than 8.3% of the disc real estate.

Figure 7:
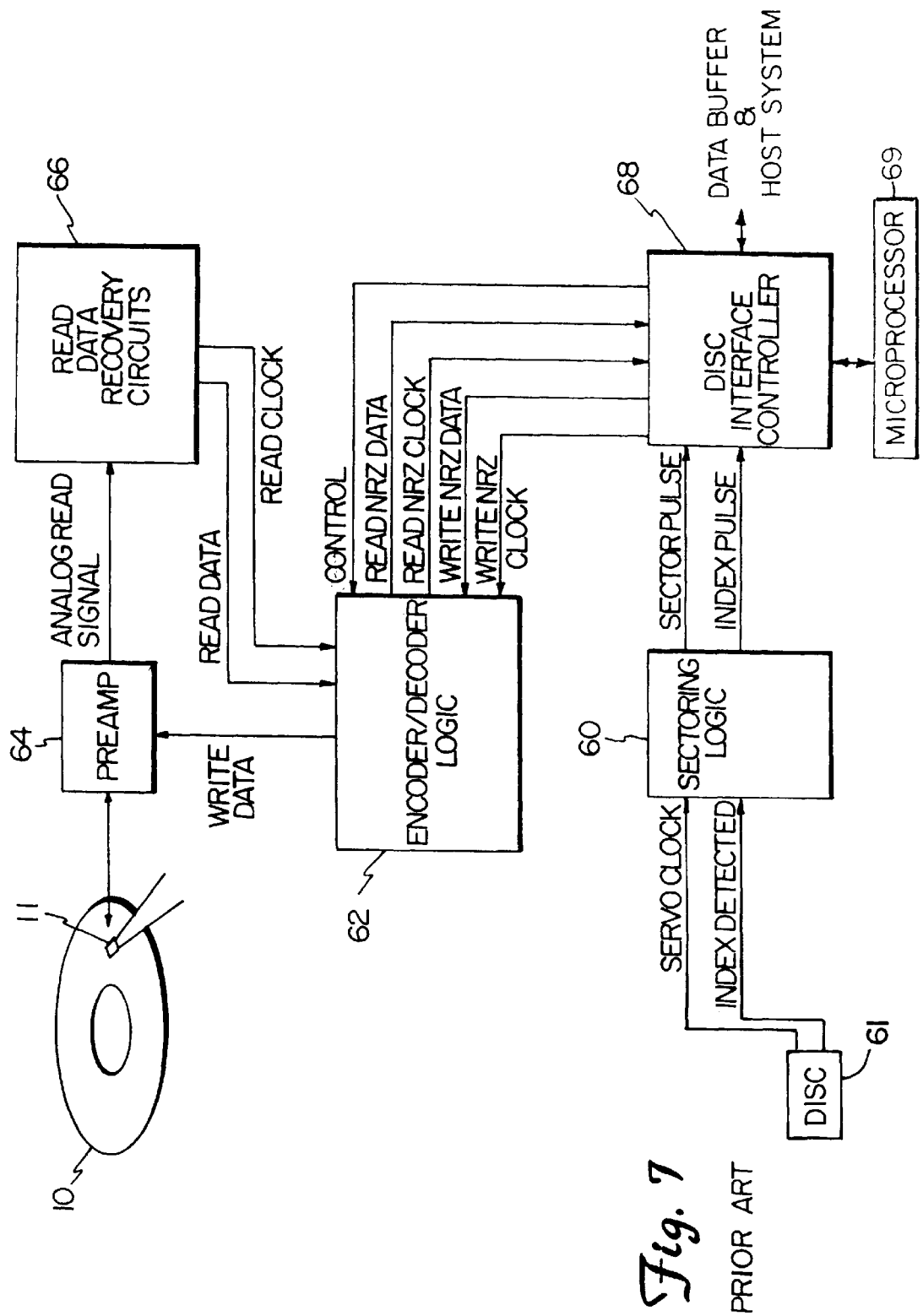
FIG. 7 is a block diagram of a prior art hard sectored read/write disc system having a dedicated servo system.

FIG. 7 is a block diagram of the read/write recovery and control system of a typical hard-sectored hard disc drive having a dedicated servo system. The disc is considered hard-sectored because the circumferential locations of the sectors on the disc are indicated by a sector pulse or an index pulse generated by sectoring logic 60, the sector or index pulse being dictated by servo clock signals and index signals recovered from servo disc 61. More particularly, a dedicated servo disc of the disc stack contains an index mark at a specific location on its circumference so that the index information is read from the servo disc once each revolution. Likewise, clock data are recorded on the servo disc from which a servo clock is derived. Sectoring logic 60 receives the servo clock and index signals from the servo disc associated with the data disc and derives the sector pulse and index pulse. Data disc 10 contains a plurality of concentric tracks 12 (FIG. 1) to which data may be written and from which data may be read by an adjacent or confronting transducer head 11. Encoder/decoder logic 62 provides digital write data to preamplifier 64. Data read from the disc by head 11 are read into preamplifier 64 to provide an analog signal to read data recovery circuit 66, which in turn provides digital read data and digital read clock information to encoder/decoder logic 62. Disc interface controller 68 receives the sector pulse and index pulse from sectoring logic 60 and provides controls to encoder/decoder logic 62. Disc interface controller 68 interfaces with microprocessor 69, which controls the operation of the disc drive. The disc interface controller transfers read data from logic 62 to a data buffer (not shown) connected to a host processor (not shown), and provides write data and write clocks to logic 62 for writing onto disc 10.

Figure 8:
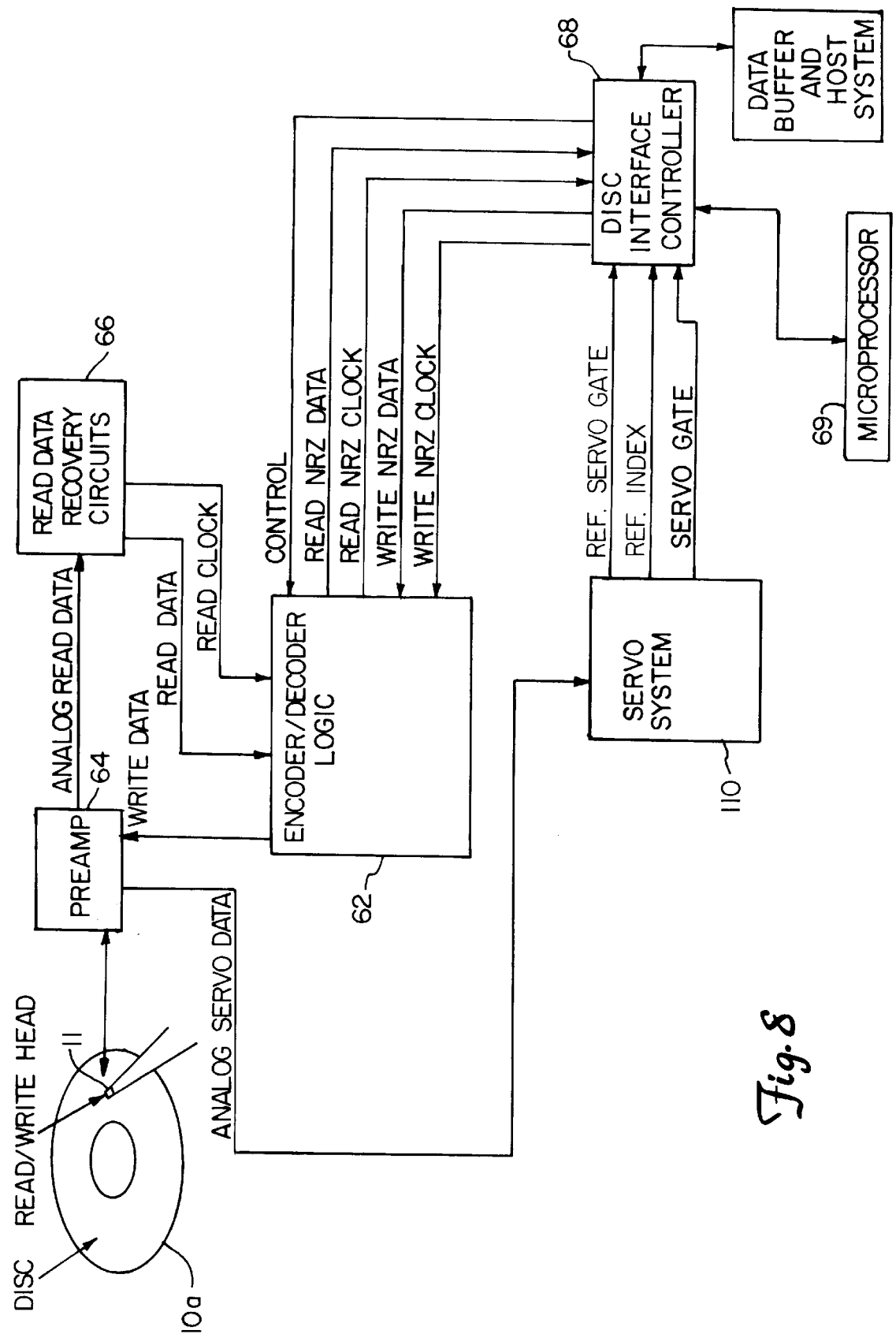
FIG. 8 is a block diagram of a prior art hard sectored read/write disc system having an embedded servo system.

FIG. 8 is a block diagram of the read/write recovery and control system of a typical hard-sectored hard disc drive having an embedded servo system. The recovery and control system of FIG. 8 is similar to that of FIG. 7, with the principal differences being in the servo recovery system to accommodate the embedded servo data. Particularly, the servo data within the spokes 13 on disc 10a includes an index mark at a specific location on its circumference so that the index information is read from the servo data once each revolution. The servo data are recorded at a frequency lower than the data recording frequency and typically include some or all of a synchronization field, an automatic gain control field, track identification in grey code, servo number and head number (where multiple heads confront the disc surface), and analog track centering data. Servo system 110 receives analog servo data including the index signals from preamplifier 64 and derives the reference servo gate pulse, reference index pulse and a servo gate signal which spans the spoke. The servo gate is operated each time a spoke is encountered by head 11. Typically, the servo system 110 includes a phase locked oscillator (PLO) or other clocking device to generate and maintain clock signals through the period that the head confronts the logical wedge between spokes 13.

Figure 9:
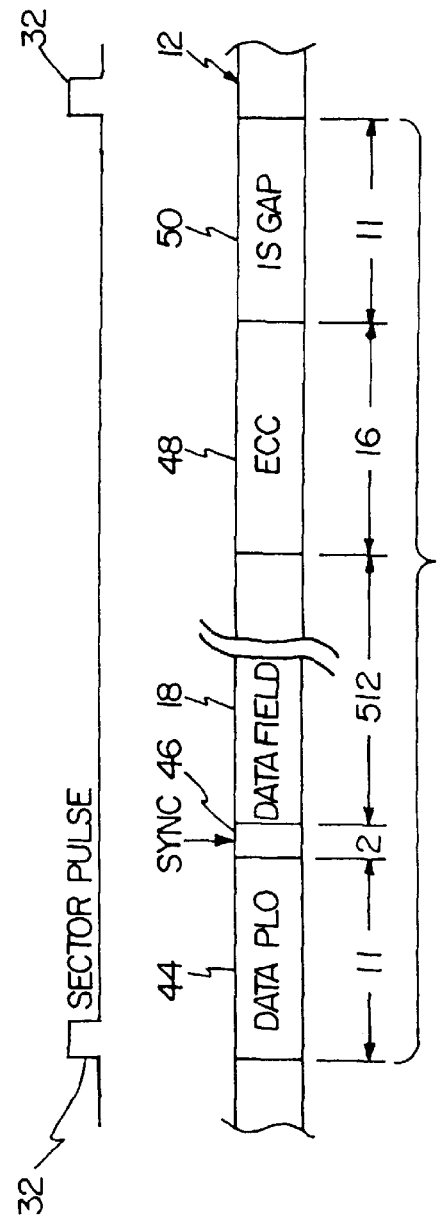
FIG. 9 illustrates a sector format for a headerless format for a disc used with a dedicated servo system according to the present invention.

The present invention provides a modified sector format in which the header(s) are eliminated. FIG. 9 illustrates sector 70 for a dedicated servo system, and FIG. 10 illustrates a sector 70a for an embedded servo system, both according to the present invention. In each case, the sector comprises an 11-byte data PLO field 44, a 2-byte synchronization pattern 46, a 512-byte data field 18, a 16-byte error detection and correction code field 48 and an 11-byte intersector gap 50. In the case of an embedded servo system, a spoke may or may not also be included, depending on the location of the sector in the data wedge. An inspection of the format illustrated in FIG. 9 reveals that sector 70 comprises 552-bytes and has a format efficiency of 92.6%. The format illustrated in FIG. 10 results in a format efficiency of 85.7% and results in 14 additional sectors on the track, compared to the format in FIG. 5. It will be appreciated that depending on the read/write frequencies, types of heads and read channel circuitry used, and relative size of the error detection and correction codes, sector 70 will have a format efficiency between about 84 to 94% for dedicated servo systems and about 81 to 92% for embedded servo systems. It will also be appreciated by those skilled in the art that since the recovery circuits do not need to switch between the header and data modes, the intersector gap 50 may be reduced in size to 11 bytes as shown, resulting in increased efficiency. It will also be appreciated that if the size of the data field is not changed with the present invention (remains at 512 bytes), the overall size of the sectors is reduced, thereby reducing the maximum, and hence, average, size of the runt sectors, thereby increasing efficiency. Hence, an important aspect of the present invention resides in a sector format that consists essentially of the data PLO field 44, synchronization pattern 46, data field 18 and ECC field 48. The remaining field, namely the intersector gap 50, is not considered "essential" to the format as it does not affect operation of the sector, but is present to accommodate read/write changes between sectors (albeit, an important consideration).

The headerless format system according to the present invention removes the latency required to re-read header information by storing sector defect management data in hardware. Moreover, additional hardware is not required to correct header field errors, and there is no adverse increase in the header format. As a result, elimination of the header format increases the capacity and performance of the disc drive. Moreover, data frequencies may be increased without an unacceptable performance impact on the host system due to header errors.

Dedicated Servo System

FIG. 11 is a block diagram of the read/write system for a hard sectored disc drive having a dedicated servo according to the present invention. The read/write system of FIG. 11 is similar to the prior art read/write system of FIG. 7, except that sectoring logic 80 replaces sectoring logic 60 of FIG. 7, sector translation logic 84 is added, and controller 86 provides handshake control with logic 84. Both sector translation logic 84 and controller 86 are connected to microprocessor 69. The hard index and servo clock signals are provided by servo disc 81 to sectoring logic 80 as previously described. Sectoring logic 80 receives the index from the servo disc surface to generate the index pulse, and produces sector pulses from a register (not shown) synchronized to a clock signal derived from the servo disc in a manner well known in the art. Sectoring logic 80 includes counter 82 responsive to the index and sector pulses to identify the physical sector number of the current sector confronting the transducer head. Counter 82 is reset to 0 by the index pulse and incremented by sector pulses to provide identification of the number of the sector currently confronting the transducer head. Sector translation logic 84 interfaces with disc interface controller 86 in accordance with an interface protocol. Interface protocol between logic 84 and controller 86 consists of a handshake of an SP enable signal to logic 84 and an SP found signal to controller 86.

Sector identification is generated by sectoring logic 80 and is used to identify the sector presently confronting the transducer for both read and write purposes. Hence, when microprocessor 69 instructs the writing to a specific sector or the reading from a specific sector, the current sector identification is generated by sectoring logic 80. Sector translation logic 84 responds to a sector request from interface controller 86 to provide the SP found signal to controller 86 when the sector requested by microprocessor 69 has been found. Hence, the apparatus shown in FIG. 11 does not require sector identification be maintained on the storage disc, nor in a large permanent memory or table maintained by the processor. Instead, sector identification is determined from index and sector pulses from servo disc 81.

Figure 12:
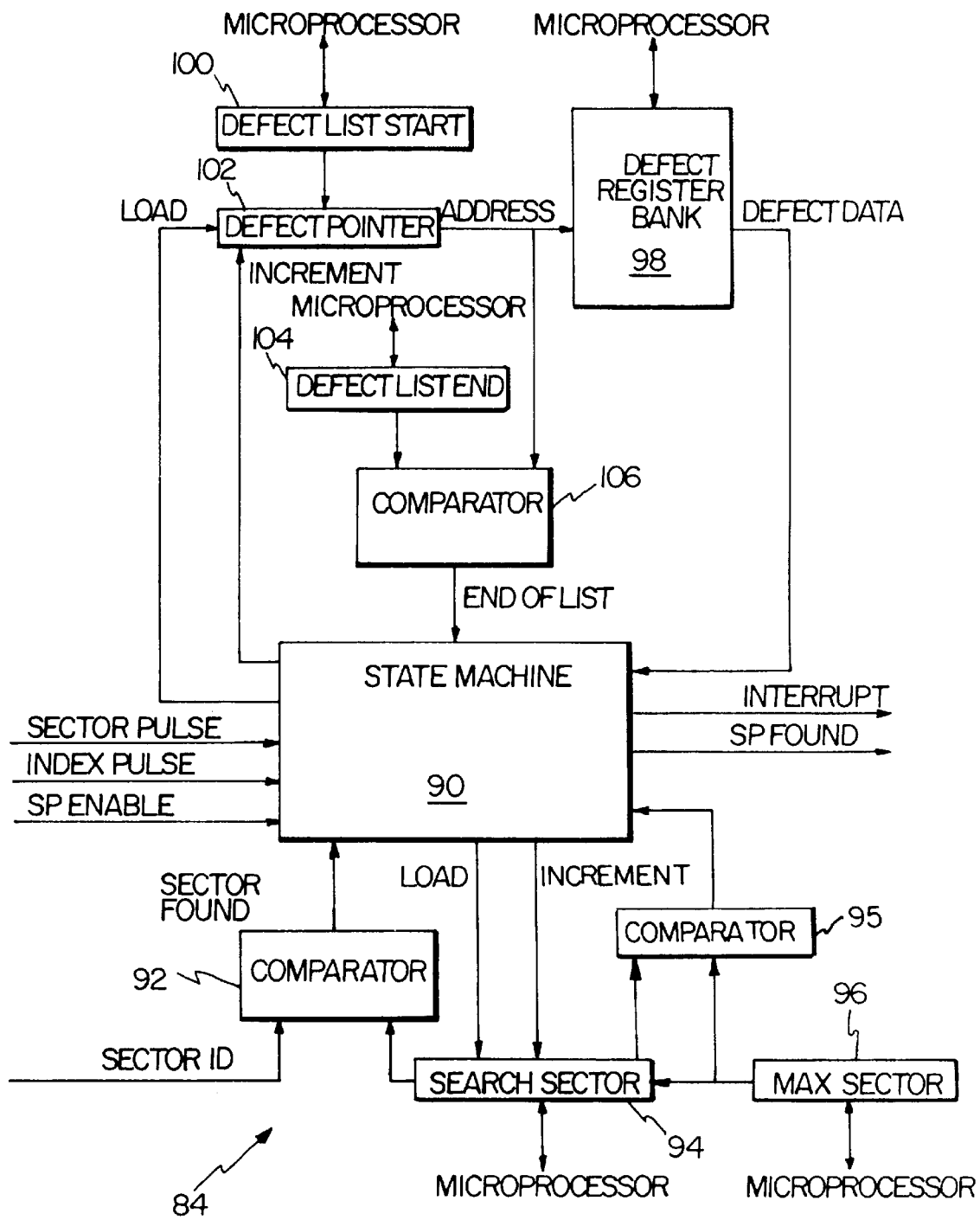
FIG. 12 is a block diagram of sector translation logic employed in the apparatus shown in FIG. 11.

FIG. 12 shows the details of sector translation logic 84. Logic 84 includes state machine 90 which receives sector pulse signals and index pulse signals from sectoring logic 80 and the SP enable signal from disc interface controller 86. The sector ID signal from sectoring logic 80 is provided to comparator 92 which compares the sector identification to a sector number in search sector counter 94. Search sector counter 94 is large enough to handle the identification number of the highest number of sectors per track that the disc drive will support. For example, if the disc contains no more than 256 sectors on a single track, the width of sector counter 94 is at least 8 bits. Comparator 92 provides a sector found signal to state machine 90 when the sector ID from sectoring logic 80 matches the sector number in counter 94. Search sector counter 94 is loaded with an initial count by microprocessor 69 indicating the starting sector in the track for transfer. Max sector register 96 has a width at least as large as counter 94 (for example, 8 bits) and contains the number of the highest physical sector for the current track as provided by the microprocessor. For example, if there are 242 sectors in the current track (numbered 0–241), register 96 is loaded with a count of 11110001 (binary) from the microprocessor. When the count in search sector counter 94 has reached the maximum count established by max sector register 96, counter 94 is reset to zero at the next increment, thus implementing a modulo N counter 94, where N is the number of sectors on the track.

Defect register bank 98 is connected to the microprocessor to receive signals identifying the defective sectors of a given track. More particularly, as the microprocessor instructs the seek mechanism (not shown) to cause head 11 to seek a particular track, the microprocessor also loads a track defect sector list into bank 98. The track defect sector list identifies the sectors of that track which are defective and how the defects should be managed. (As will be explained below, loading of a track defect sector list into bank 98 can be performed well before the seek operation.) The microprocessor also provides identification of the starting point of the defect list to defect list start register 100 and of the end point of the defect list to defect list end register 104. Defect pointer 102 is a counter loaded by state machine 90 and incremented to point to successive addresses in bank 98, thereby pointing to successive defective sector numbers. State machine 90 is operable to provide an interrupt signal to the microprocessor to interrupt the transfer of data between disc controller 86 and the track when the current search sector number matches a defect sector number (defect data) and the defect data has its flagged bit set.

The defect register bank 98 is a dual-port bank of registers accessed simultaneously by the microprocessor and by state machine 90. The microprocessor has read/write access to all registers in bank 98, whereas state machine 90 has only read access to the register in the bank addressed by defect pointer counter 102.

Figure 13:
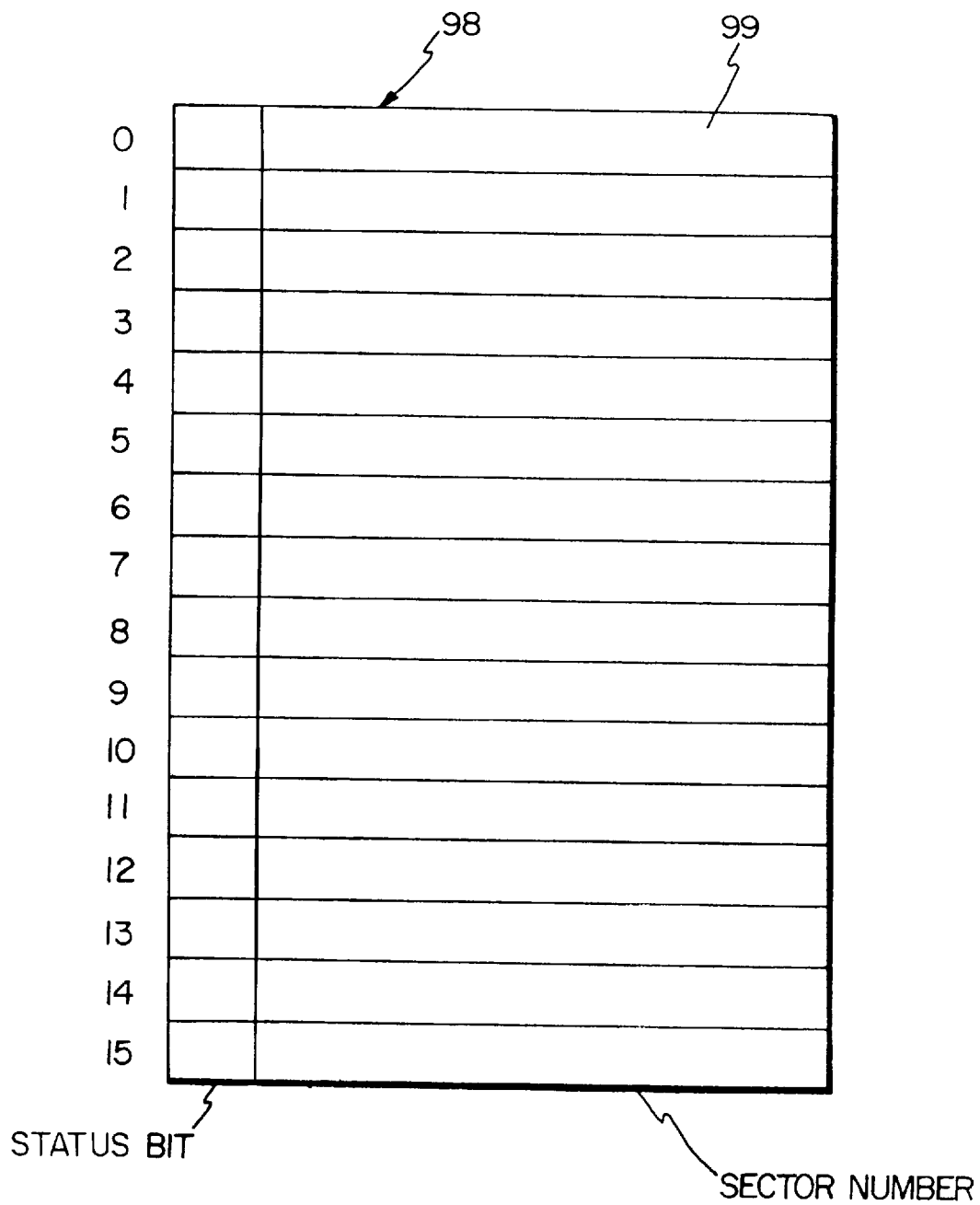
FIG. 13 illustrates the layout of a defect register bank employed in the apparatus shown in FIG. 12.

FIG. 13 illustrates the layout of defect register bank 98. Each register (0–15) has a field 99 having a width at least equal to the number of bits in the sector identification number. Each register has an additional bit location to store a status bit for each entry of the defect list. The status bit is used for defect management. Hence, where the largest track has 256 sectors, and the sector number is 8 bits, each register in bank 98 is 9 bits wide; 8 bits for the sector number and 1 bit for defect management control.

Data should not be read from or written to a defective sector. In the prior art, when the header indicated that a sector was defective, the disc interface controller inhibited or prevented transfer of data to or from that sector. If a "skipped" bit in the header was set, the disc interface controller operated the drive to read data from or write data to the next successive sector (assuming it was not defective). If a "flagged" bit in the header was set, usually indicating that no successive sector was available, the controller issued an interrupt signal to the processor, causing the processor to read data from or write data to an alternate track and sector location. The status bit in defect bank 98 serves a similar purpose. More particularly, state machine 90 is responsive to a status bit equal to zero or clear to operate controller 86 to transfer data with the next successive sector on the track (if available), whereas the state machine is responsive to a status bit equal to one to initiate an interrupt signal to microprocessor 69 to cause the microprocessor to initiate data transfer with an alternate track and sector. Hence, a zero status bit indicates a sector skipped condition and a one status bit indicates a sector reassigned condition.

It is common to arbitrarily set a predetermined maximum number of sectors that may be defective in a given track. If a track has more than that preselected number of defective sectors, the entire track is identified as defective and is ignored by the microprocessor. More particularly, the microprocessor is programmed to not write data to or read data from a track containing more than the predetermined maximum number of defective sectors. Typically, no more than 8 defective sectors are permitted in a given track. If a track contains more than 8 defective sectors, the entire track is considered defective.

The length (number of registers) of defect register bank 98 is chosen to be at least twice as large as the highest number of allowable defective sectors permitted in a given track. Thus, where the maximum number of defective sectors in a track is set at 8, defect register bank 98 is chosen to have a length of at least 16 registers as shown in FIG. 13. This permits splitting the defect register bank logically into two partitions so that the microprocessor may advance load the defect list of the next track into bank 98 while the bank is providing defect data to the state machine for the current track.

The defect list start register 100, defect list end register 104 and defect pointer counter 102 are wide enough to each hold one address of the defect register bank. For example, if the length of defect register bank is 16, registers 100 and 104 and counter 102 are each 4 bits wide. The defect list start and defect list end registers 100 and 104 are loaded by the microprocessor to define the defect list boundaries within bank 98 for the current track. For example, if the microprocessor has loaded four defective sector numbers into bank 98 for the current track, and these occupy positions 3, 4, 5 and 6 in bank 98, the microprocessor loads the address of the first defective sector (0011) into register 100 and the address of the last defective sector plus one (0111), into register 104. Defect pointer counter 102 is loaded to the defect list start address ("0011" in the example) and is incremented through the defect register bank addresses through the last defect location (0110) loaded in bank 98 for each new search sector number. When bank 98 provides the defect data at address 0110 to state machine 90, pointer 102 is incremented by state machine 90 to address 0111. Since address 0111 matches the address in register 104, comparator 106 provides state machine 90 with the match indication indicating that the current search sector is not defective.

Most tracks contain no defective sectors. In such cases, the microprocessor loads the same number (preferably 0000) into both the defect list start register and the defect list end register. A match of the defect list start data and the defect list end data indicates the track is defect free.

If state machine 90 finds that the sector number in search sector counter 94 matches a sector number in the defect data from bank 98, state machine 90 waits for an SP enable signal from controller 86. When the interface controller provides the SP enable signal, state machine 90 will take either of two actions, depending on the state of the status bit in the defect data. If the status bit is not set, the state machine increments the search sector counter so that data transfer cannot occur with the current (defective) sector. Instead, if the next sector is not defective (identified on the defect list), data transfer with that sector occurs when the sector ID matches search sector counter 94. On the other hand, if the status bit is set, state machine 90 initiates an interrupt to the microprocessor, permitting the microprocessor to effectuate data transfer with an alternate track and sector.

Figure 14:
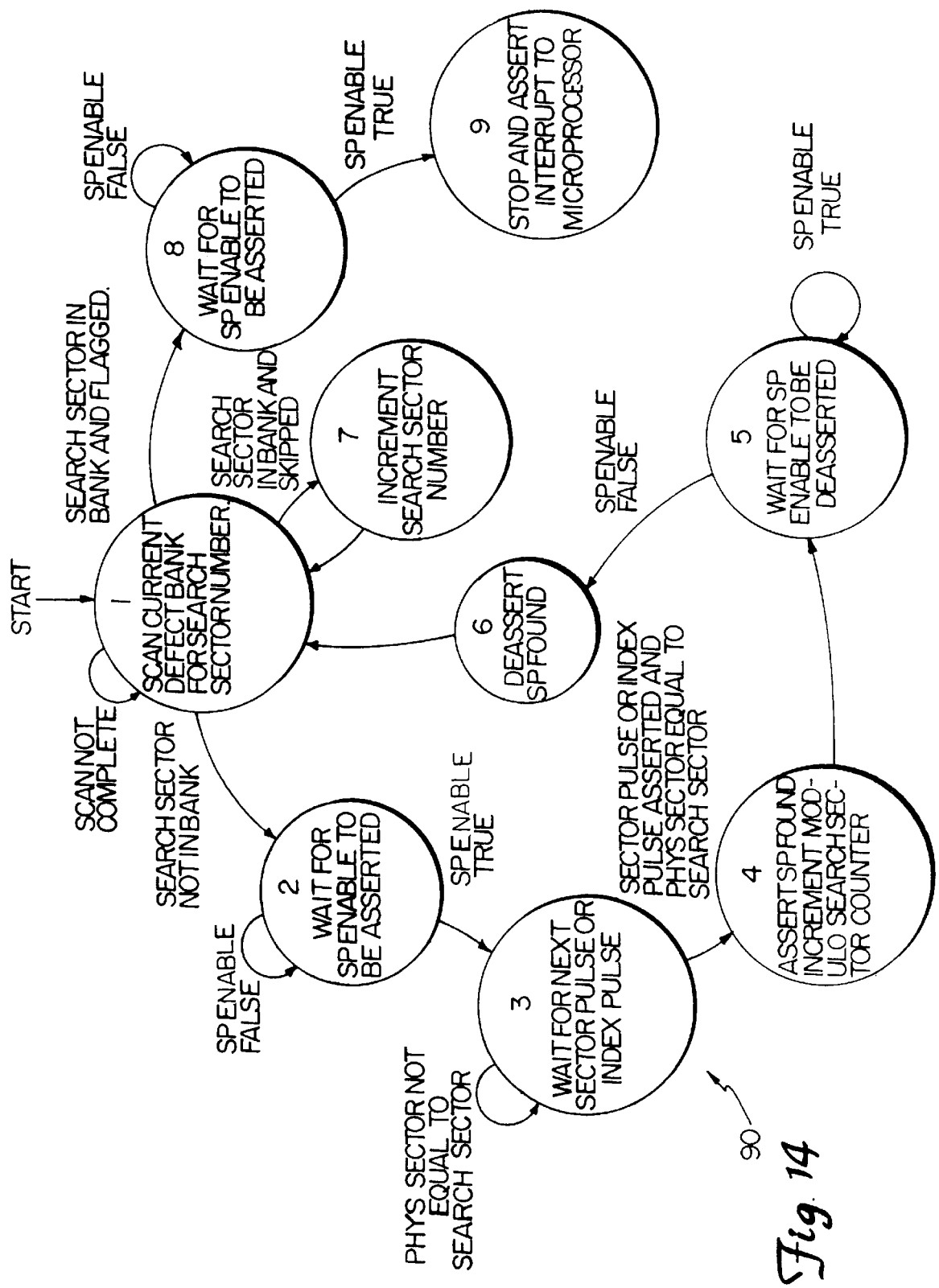
FIG. 14 is a state diagram of a state machine shown in FIG. 12.

Referring to FIG. 14, with search sector counter 94 set to the starting physical sector number for the transfer, the microprocessor initiates state machine 90 to its state 1 and the state machine scans defect register bank 98 from start to end, comparing the sector numbers in bank 98 to the sector number in search sector counter 94. If state machine 90 finds no sector number in the defect list matching the sector number in counter 94, state machine 90 transitions to state 2 where it waits for disc interface controller 86 to assert an SP enable signal. When controller 86 is ready to transfer data to or from a sector, it asserts an SP enable signal to state machine 90 to begin the handshake between logic 84 and interface 86. After detecting a true condition of the SP enable signal, state machine 90 transitions to state 3 to await the target sector ID.

The target sector ID is found when the current sector identification from counter 82 in sectoring logic 80 (FIG. 11) matches the sector number in counter 94. This comparison is detected by comparator 92. Thus, comparator 92 provides a sector found signal to state machine 90 indicative that the target sector has been found. The leading edge of the target sector pulse or index pulse for the sector causes state machine 90 to enter state 4 where it asserts an SP found signal to controller 86, signifying the precise location of the target sector. The state machine 90 also modulo increments the search sector counter 94 and transitions to state 5 where it awaits controller 86 to deassert the SP enable signal. When controller 86 begins transferring data to or from the target sector, causing a read of data from that sector or write of data to that sector, it deasserts the SP enable signal allowing state machine 90 to transition to state 6. At state 6, state machine 90 deasserts the SP found signal, thereby completing the handshake and returning to state 1 to search the defect register bank 98 for the next target sector number.

If during the scan of the defect register bank 98 by state machine 90, a sector number is found in bank 98 that matches the sector number in counter 94 and has its status bit set in bank 98, indicating the sector is reassigned, state machine 90 transitions to state 8 where it awaits the SP enable signal to be asserted from controller 86. When the SP enable signal is asserted by controller 86, state machine 90 halts execution at state 9 and asserts an interrupt to the microprocessor so that the microprocessor can perform the transfer to an alternate location, such as on another track. The alternate location is maintained in a lookup table or other memory location in the microprocessor, as is well known in the art.

If during the scan of the defect register bank by state machine 90 a sector number is found that matches the sector number in counter 94, and that sector number in bank 98 has its status bit clear, indicating that the sector is to be skipped, the sector is considered defective, but a spare sector has already been identified in substitution. More particularly, by convention, the data for the defective sector are to be written to or read from the next physical sector, provided it is not also defective. Hence, when encountering a sector number identified as a skipped sector, state machine 90 transitions to state 7 where it increments the sector counter 94 to the next sector on the track. However, if the search sector number in counter 94 is already equal to the maximum sector number indicated by register 96, state machine 90 resets search sector 94 to zero and returns to state 1 to repeat the defect search for the next physical search sector number.

It will be appreciated that the status bit provides management control for defective sectors. The disc drive microprocessor manages defect sector locations through tables and address conversion algorithms. With the system described above, the microprocessor is responsible not only for locating the cylinder and head number for the start of a transfer requested by the host system, but also for locating the starting physical sector number for the transfer and for loading the defect register bank 98 with any defective sector locations on the target track. For random disc accesses, the actuator seek time provides windows during which much or all of the extra defect management programming can be performed. For most tracks, the microprocessor may verify through a quick table search that the track is defect-free and the defect list start register and defect list end registers 100 and 104 are both set to zero.

Defect register bank 98 is a dual-port register divided into two logical segments by the microprocessor. This permits simultaneously loading and searching defect register bank 98 to accommodate disc transfers which occupy more than a single track. Thus, while a first track data transfer is occurring, the microprocessor searches for defective sectors on the next sequential track and programs the half of the defective register bank 98 which is not currently in use by the state machine 90. This technique of alternating back and forth between the two logical defect lists allows the microprocessor to load data into that list while state machine 90 is reading data from the list, all without materially impacting the track seek or head switch time.

The system is designed to support one-to-one interleaving. When a disc drive is formatted with one-to-one interleaving, logically sequential sectors are placed on the track in physically sequential order, without generally skipping any sectors, although a sector may be skipped if it is defective. One-to-one interleaving provides a fast average data transfer rate to or from the disc.

Embedded Servo System

An embedded servo system employs servo data written directly onto the data tracks in "spokes," rather than on a separate disc surface as in the case of a dedicated servo system described above. In the present invention, track positions on the various tracks are referenced to positions of the servo spoke of a virtual track which are represented by a reference servo gate signal and reference index signal. These signals are maintained by the servo system while following tracks, while seeking across multiple tracks and while changing heads. The actual servo data may be skewed or staggered from one track to another. However, the virtual track represented by the reference servo gate signal and reference index signal does not shift, and a track position on a given track differs from the corresponding position on the virtual track by the known servo skew. The track servo skew value is based on the recording zone of the track.

Figure 15:
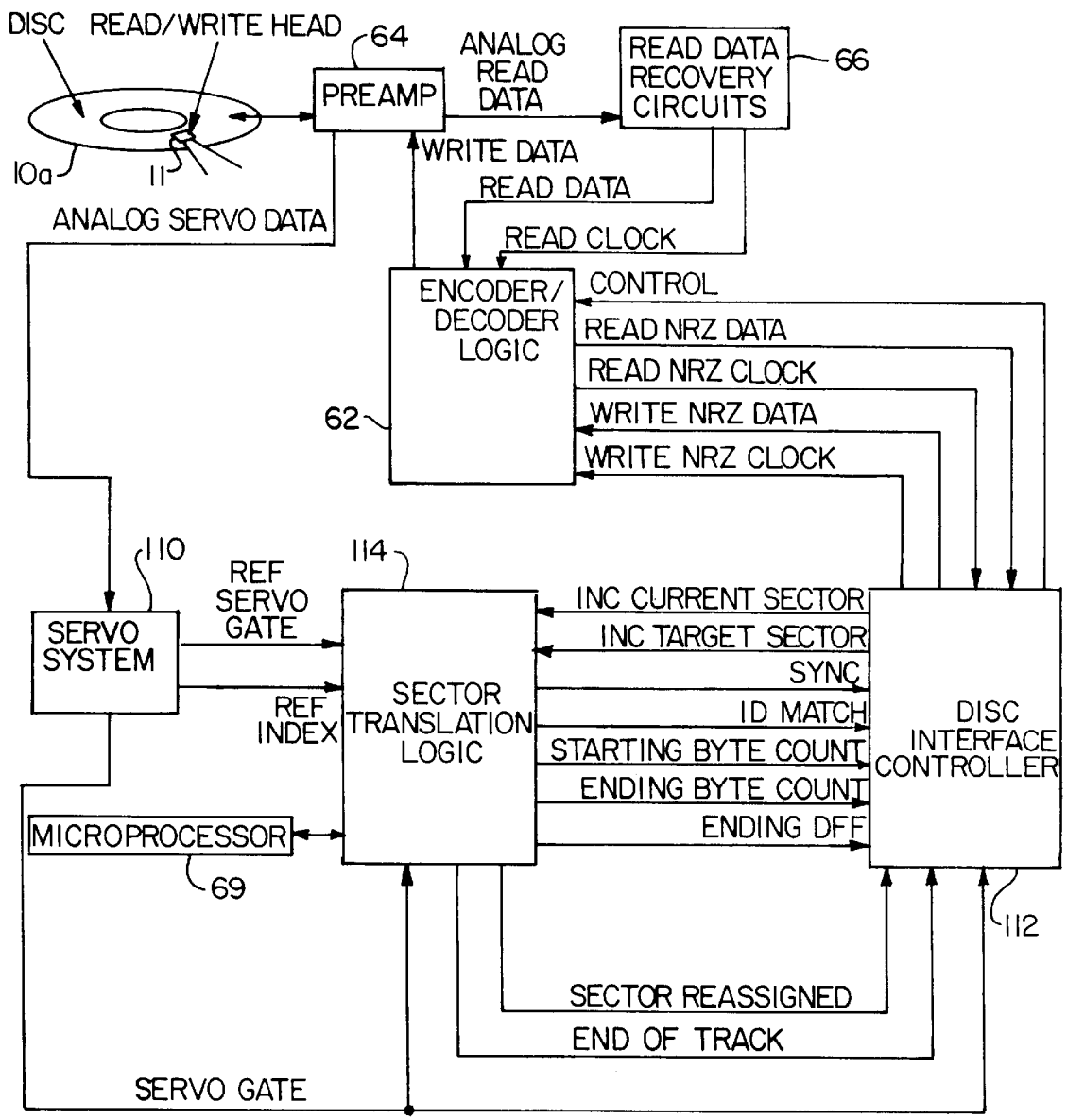
FIG. 15 is a block diagram of a read/write system for a disc drive employing the format of FIG. 10.

FIG. 15 is a block diagram of a read/write recovery and control system of a hard-sectored hard disc drive employing an embedded servo system in accordance with the present invention. While the system shown in FIG. 15 is designed for use with Small Computer System Interfaces (SCSI), the system is equally useful with disc interface controllers employing other technologies. The system employs a preamplifier 64 connected to head 11 which confronts successive tracks on disc 10a, each of the tracks containing servo spokes 13 and sectors 14 as illustrated in FIG. 10. Analog read data is supplied by preamplifier 64 to read data recovery circuit 66, which in turn provides read data and read clock signals to encoder/decoder logic 62. Disc interface controller 112 provides interface between the data buffer and host system (not shown) and encoder/decoder logic 62 in a manner similar to disc interface controller 68 shown in FIG. 8. Thus, disc interface controller 112 provides control signals as well as write data and write clock signals to encoder/decoder logic 62 and receives read data and read clock signals from encoder/decoder logic 62.

Servo system 110 receives analog servo data from the spokes 13 (FIG. 10) from preamplifier 64 and provides a servo gate signal to disc interface controller 112 and the reference servo gate and reference index signals representative of the virtual track to sector translation logic 114. Thus, the interface between the servo system 110 and preamplifier 64 is the same as that illustrated in FIG. 8.

The principal differences between the invention illustrated in FIG. 15 and the prior art system illustrated in FIG. 8 is the inclusion of headerless sector translation logic 114 and the interface between servo system 110, headerless sector translation logic 114 and disc interface controller 112.

The reference servo gate and reference index signals provide the headerless sector translation logic 114 with the ability to maintain a reference physical servo spoke number count. More particularly, the reference servo gate signal coinciding with the reference index signal represents physical servo spoke 0, the next reference servo gate pulse represents physical servo spoke 1, and so on around the reference virtual track.

The physical layout of sectors within a given data wedge is most likely to be different from the layouts of adjacent data wedges for the same track and may be unique among the data wedges comprising the track. However, for any given track, the layout of a logical data wedge w is identical to the layout of the corresponding logical data wedge w of every other track within a single recording zone. Therefore, for any track within a given recording zone, the logical wedge number defines the physical layout of data sectors for that data wedge. Thus, the layout of each track in a given recording zone is identical to the layout of every other track in that zone.

Prior to the present invention, data media for disc drives employing embedded servo systems were formatted in such manner that a header was usually placed at the beginning of each sector, as shown in FIG. 5. As an alternative to placing the header at the beginning of each sector, some systems employed a header in all or selected spokes, and not necessarily between sectors. For example, if the header is placed in each spoke, 60 headers per track will exist where there are 60 spokes. In either case, the header provided sector information for all data fields and data field fragments that followed in the data wedge, as well as defect and defect management information. A variation of the technique of placing headers in every spoke is the placement of headers in every other spoke, so that 30 headers exist per track where there are 60 spokes.

Figure 16:
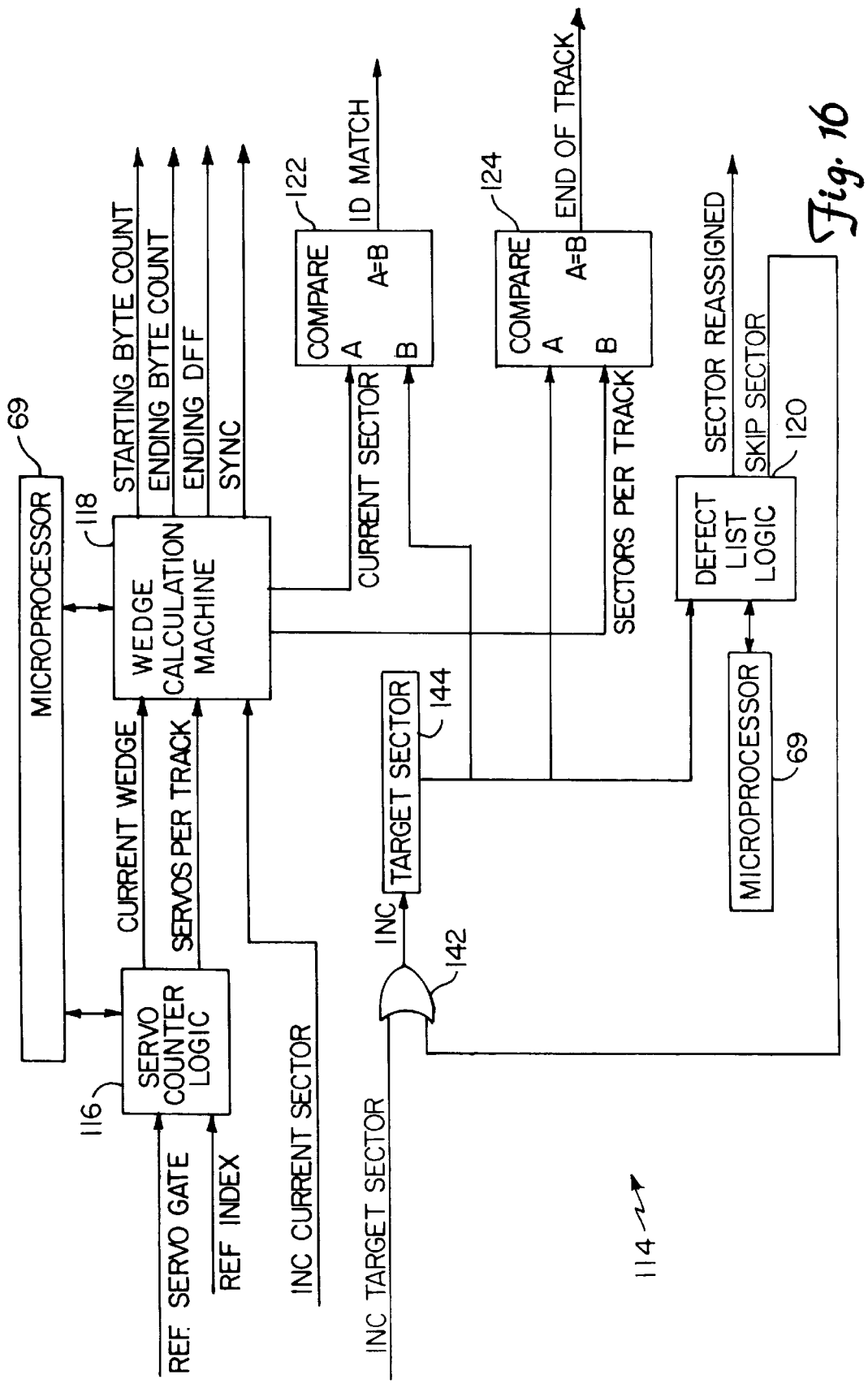
FIG. 16 is a block diagram of headerless sector translation logic employed in the apparatus shown in FIG. 15.

FIG. 16 is a block diagram of headerless sector translation logic 114 illustrated in FIG. 15. Sector translation logic 114 includes servo counter logic 116, shown in greater detail in FIG. 17, arranged to receive the reference servo gate and reference index pulse signals from servo system 110. Servo counter logic 116 provides output signals representing the identification of the current wedge of the virtual track to wedge calculation machine 118, shown in greater detail in FIGS. 20 and 21. Microprocessor 69 is connected to servo counter logic 116 and wedge calculation machine 118 to provide information on the number of servo spokes per track which is supplied through servo counter logic 116 to wedge calculation machine 118. Microprocessor 69 also calculates the track skew for the track under consideration based on the number of servo spokes between physical servo spoke 0 and logical servo spoke 0 for the corresponding track of interest.

Figure 18:
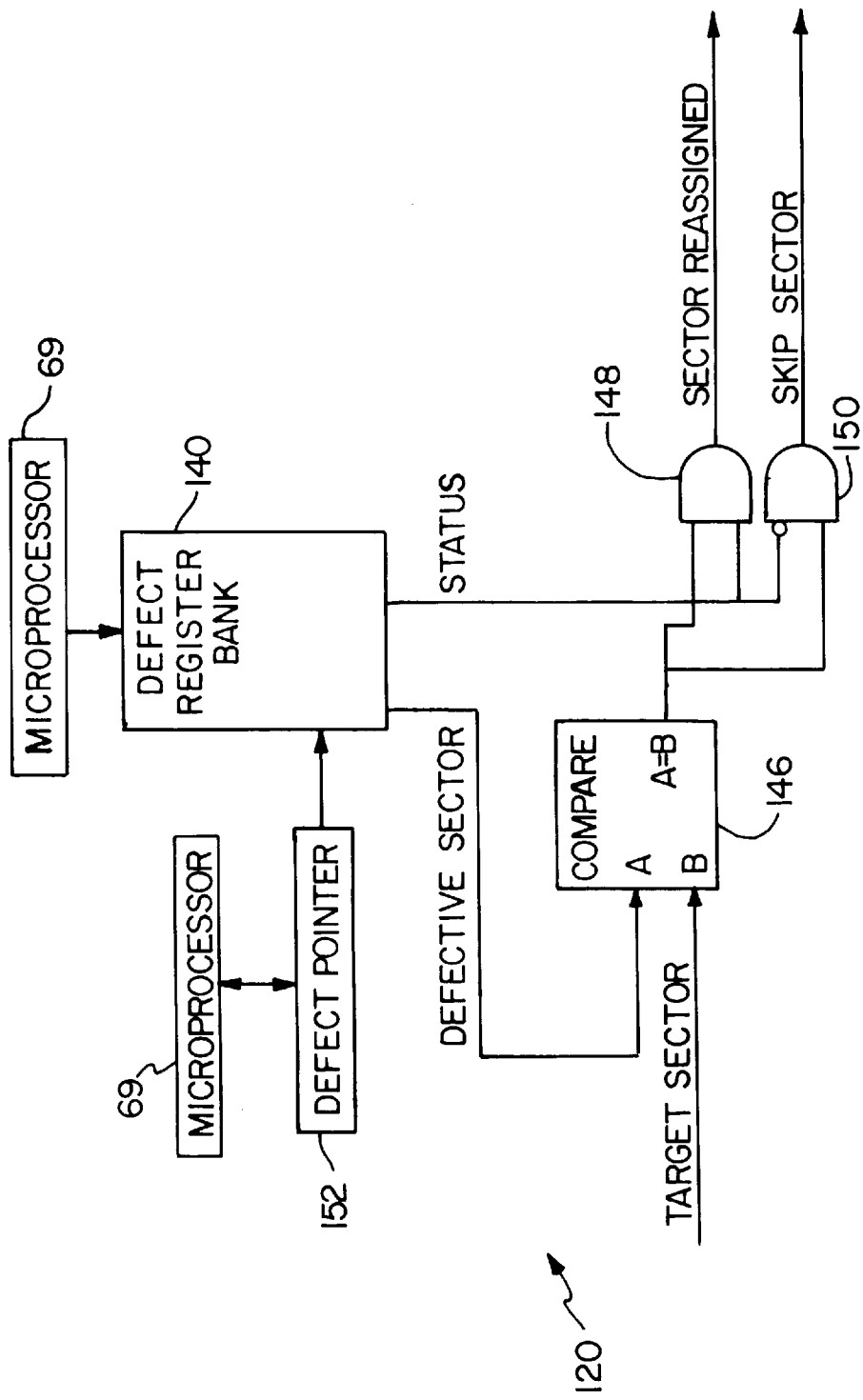
FIG. 18 is a block diagram of a defect list logic employed in the headerless sector translation logic shown in FIG. 16.

Defect list logic 120, shown in greater detail in FIG. 18, maintains information concerning defective sectors. In one form of the invention, defect list logic 120 contains enough registers to hold the maximum number of defective sectors allowed for two tracks. Consequently, the microprocessor will load defective data for the next track during data transfer for the current track.

As will be more fully explained below, wedge calculation machine 118 provides starting byte and ending byte counts that identify the starting byte of the first data field fragment and the ending byte of the last data field fragment to disc interface controller 112 (FIG. 15). Additionally, wedge calculation machine 118 provides a signal indicating the ending data field fragment in the data wedge as well as synchronization data to disc interface controller 112.

Sector identification is accomplished through comparators 122 and 124 which provide identification match and end of track signals to disc interface controller 112 based on the number of sectors per track and the current sector identification from wedge calculation machine 118 and the target sector identification 144.

Figure 17:
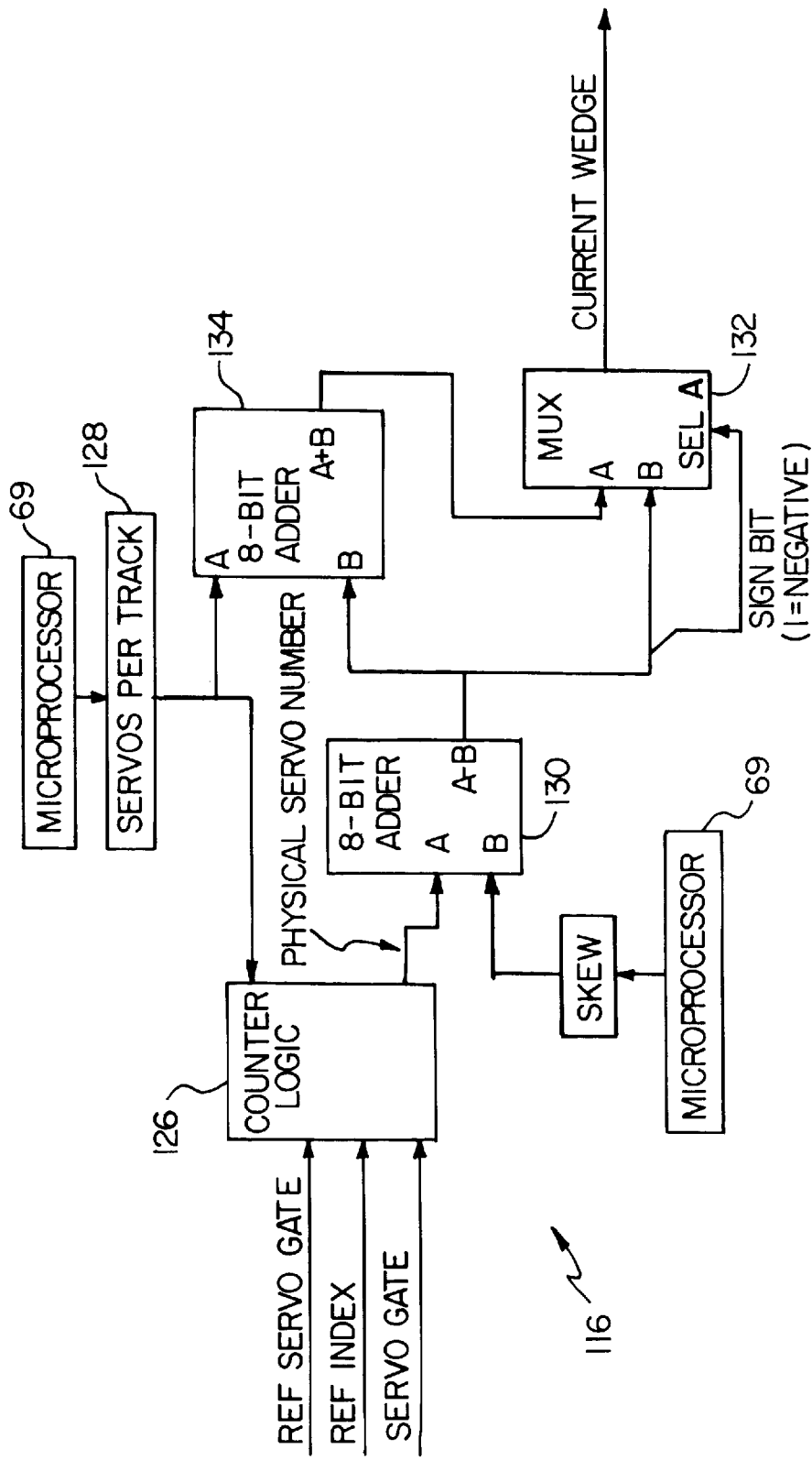
FIG. 17 is a block diagram of a servo counter logic employed in the headerless sector translation logic shown in FIG. 16.

FIG. 17 illustrates the details of servo counter logic 116 of FIG. 16. Counter logic 126 receives the reference servo gate signal, reference index signal and servo gate signals from servo system 110 (FIG. 15). As previously explained, the reference index pulse occurs at the spoke at the beginning of each track whereas reference servo gate pulse occurs during each spoke along the track. Counter 126 counts the number of servo gate signals from the previous reference index. Microprocessor 69 identifies the number of servo spokes per track at 128, and counter logic 126 counts the spokes up to the number of spokes in the track set. Counter 126 is reset upon reaching the count equal to the number of spokes in the track. Hence, the output of counter 126 identifies the number of the current physical servo spoke, and hence of the current physical wedge of the logical track.

As previously mentioned, the logical spokes of an actual track are skewed from the reference physical spokes of the virtual track reference. Adder 130 adjusts the physical wedge number to the logical wedge number by subtracting the skew data from microprocessor 69 to the physical wedge number to identify the logical wedge number. If the output of adder 130 is negative, multiplexer 132 selects adder 134, which adjusts the wedge number back into the range between zero and one less than the number of servos per track, inclusive. Thus, adders 130 and 134 and multiplexer 132 implement a modulo conversion of the physical wedge number to the logical wedge number. Therefore, multiplexer 132 provides a count indicative of the current wedge confronting head 11. This information is provided to wedge calculation machine 118.

FIG. 18 illustrates defect list logic 120 of FIG. 16. As previously explained in connection with the dedicated servo system, with the absence of the headers from the medium, defect sector information is also no longer contained on the disc. Consequently, defect management is accomplished through use of defect list logic 120 illustrated in FIG. 18. The defect list logic includes defect register bank 140 which receives defect information from microprocessor 69. Defect register bank 140 is similar to defect register bank 98 described in FIG. 12, and contains enough registers to hold the maximum number of defective sectors allowed for at least two data tracks. Hence, microprocessor 69 can load defect data for the next track during data transfer on the current track. The layout of defect register bank 140 is similar to that shown in FIG. 13. Thus, as described above in connection with FIG. 13, the identification of a sector in the defect register bank presumes the condition of a defect, and the only additional information is which of two management conditions should be employed.

Each defective sector requires a single entry in defect register bank 140. Each entry contains the defect sector number (from 0 to n−1 for n sectors per track) identifying the defective sector. Each entry also contains a status flag identifying the management action to be taken. If the status flag is 0, the defective sector is skipped, and if the status flag is 1 the disc interface controller is interrupted from data transfer with the sector and the defective sector is reassigned. The presence of the sector number in the register list identifies that the sector is defective. The flag identifies the management action to be taken.

As shown in FIG. 16, a target sector number is identified at 144 and is incremented at 142 whenever a skip sector instruction is received from defect list logic 120 or an increment target sector signal is received from disc interface controller 112 (FIG. 15). The skip sector instruction results from a 0 status flag from gate 150 (FIG. 18). The target sector data is provided to comparator 146. If the target sector number 144 corresponds to a defective sector number in defect register bank 140, comparator 146 operates one or the other of gates 148 or 150 to set a sector reassigned status or a skip sector status pulse, based on the status of the flag from defect register bank 140. A skip sector pulse from defect list logic 120 increments target sector number 144 (FIG. 16). Thus, the target sector identification is incremented when the target sector is defective and should be skipped. Defect pointer 152 (FIG. 18) increments to point to the next defect sector number in defect register bank 140.

If the sector reassigned signal is set by gate 148, the sector reassigned signal is applied to disc interface controller 112 (FIG. 15) which interrupts the data transfer and commences procedures to move the head to a new sector, usually on a different track, as assigned by microprocessor 69.

As shown in FIG. 16, target sector number 144 is also applied to comparators 122 and 124. As described above, comparator 122 also receives the current sector identification. If comparator 122 identifies a match between the current sector from wedge calculation machine 118 and the target sector, an output is provided indicating that the current sector is the target sector, and the disc interface controller 112 can perform such read or write or other function intended. On the other hand, if the target sector number identifies a sector number outside the range of the track, the target sector number is invalid and comparator 124 indicates that the track has ended.

Figure 19:
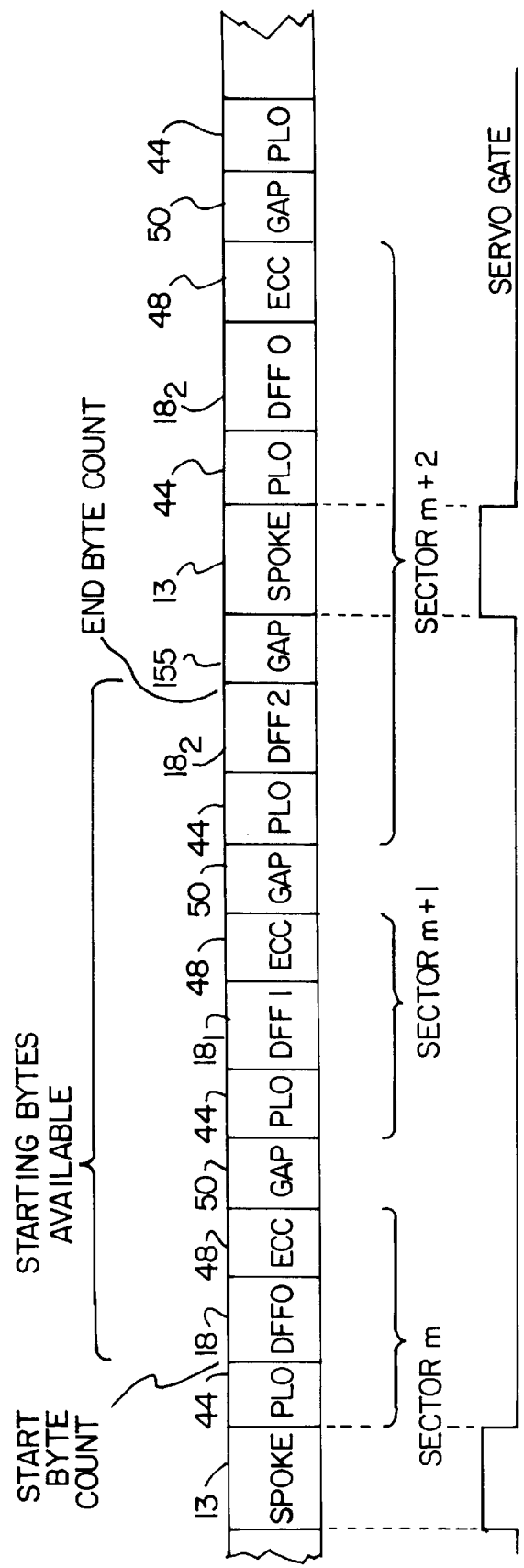
FIG. 19 illustrates the layout of a data wedge of a track employing the principles of the embedded servo system according to the present invention.

Wedge calculation machine 118 (FIG. 16) converts the current wedge number output from multiplexer 132 in servo counter logic 116 (FIG. 17) into a set of data useful to the disc interface controller 112 (FIG. 15) to define the physical sector layout for the next data wedge. Before describing the features of wedge calculation machine 118 in detail, a description of, and terminology relating to, the data wedge may be useful. FIG. 19 is a representation of a typical data wedge and the servo gate associated therewith. FIG. 19 shows three sectors, m, m+1 and m+2, with sector m+2 being segmented by a spoke 13. A PLO field 44 precedes each data field fragment (DFF), including the data field fragment following a spoke 13. The data field fragment may be an entire data field, or a portion of a data field already started from the previous wedge, or a portion of a data field not completed in the present wedge. Thus, the data field of sector m+2 is shown split as DFF2 in the data wedge under consideration and DFF0 of the next data wedge.

A starting byte count index is established at the beginning of the first data field fragment DFF0 following a spoke. The byte count starts at 0 at the beginning of each sector and increments once for each byte in the sector. An end byte count index is established at the end of the data field fragment at the end of the data wedge (the last byte of DFF2). The end byte count corresponds to the number of the last byte of the last data field fragment of the data wedge.

To compute the physical layout of a data wedge, wedge calculation machine 118 begins with the end byte count from the previous data wedge, which becomes the starting byte count to the current wedge. With the starting byte count, the task of calculating the layout of the data wedge is performed by a state machine. To perform the task of calculating the layout of the data wedge, the state machine requires the following information:

(1) The number of sectors on the current track, which is the same for every track within a single recording zone.
(2) The data field size, which is the number of bytes in the data field of a sector and is typically 512 bytes.
(3) The starting number of bytes available, which is the total number of bytes available in the data wedge excluding the size of the PLO and sync pattern fields which start the data wedge.
(4) The number of bytes reserved for the ECC field at the end of each sector.
(5) The number of bytes reserved for intersector gaps 50.

Figure 20:
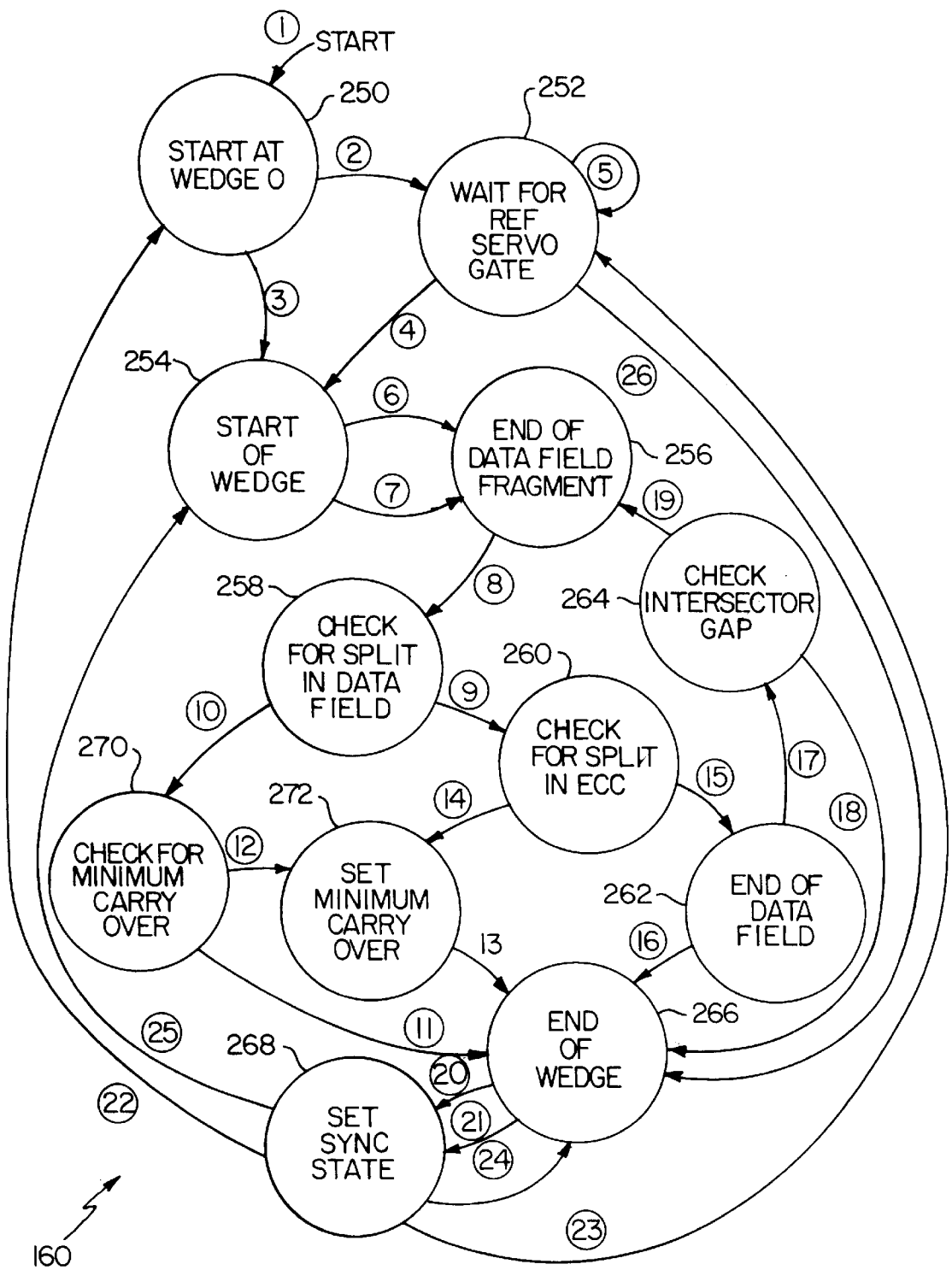
FIG. 20 is a state diagram of a wedge calculation machine employed in the headerless sector translation logic shown in FIG. 16.
Figure 21:
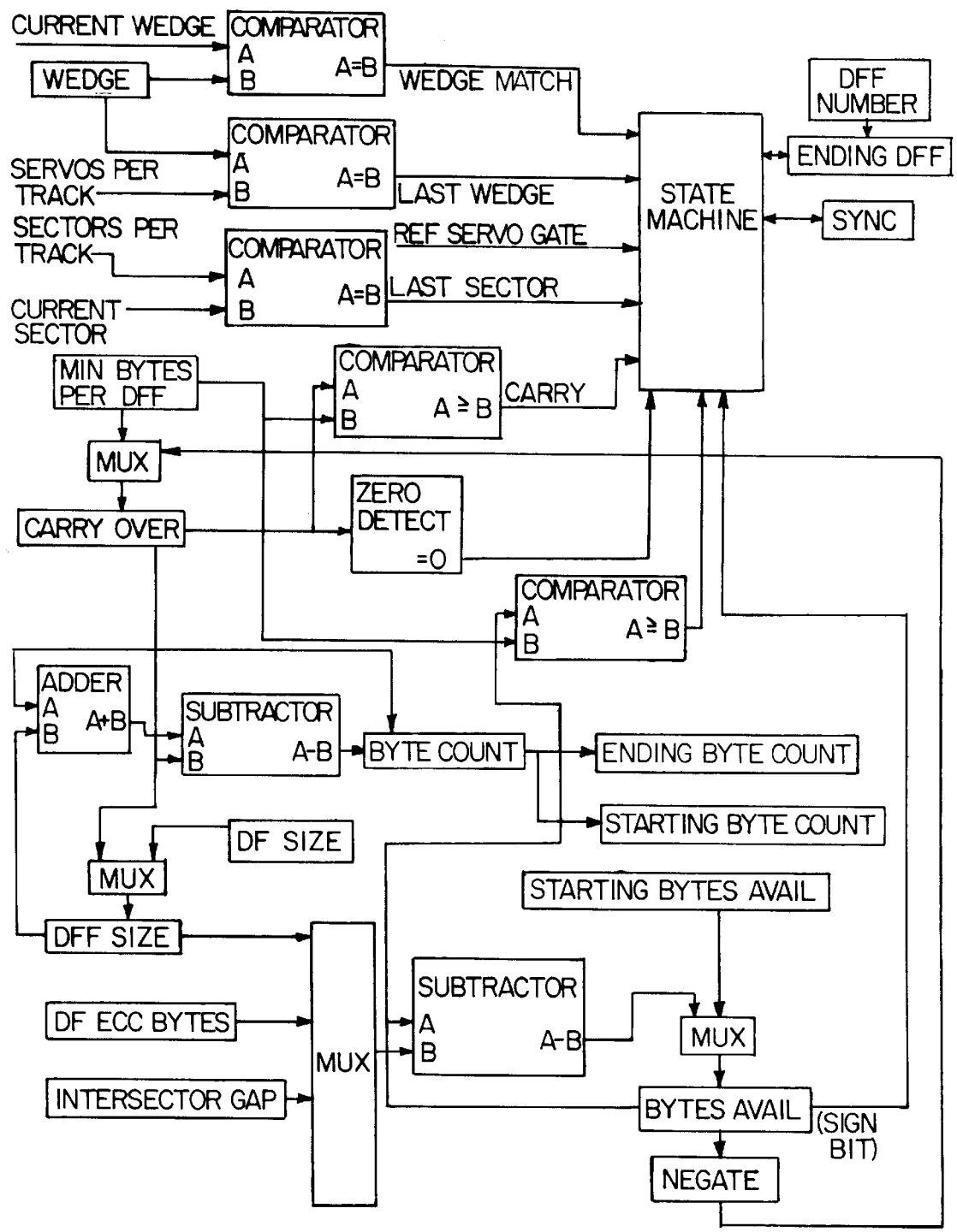
FIG. 21 is a block diagram illustrating the data paths of the wedge calculation machine shown in FIG. 20.

FIG. 20 is a state diagram for wedge calculation machine 118, and FIG. 21 is a block diagram of wedge calculation machine 118, showing data paths only (absent control paths). In FIG. 20, when the logical wedge number wraps from its maximum value back to zero, representing the logical beginning of the data track, the wedge calculation machine starts with a starting byte count of zero, corresponding to the start of sector zero on the track. The byte count is reset to zero at the beginning of each sector, and is incremented by one for each successive byte in the data field fragment. For other data wedges on the track where a data field has been split and a data field fragment is carried forward from the prior wedge, the ending byte count value from the prior wedge is carried forward to begin the calculation of the physical layout of the next data wedge. Since the byte count is reset to zero for the beginning of the sector, the starting byte count is zero for any wedge beginning with the start of a sector. Thus, the wedge calculation logic obtains and maintains synchronization to the track to provide valid information to disc interface controller 112 (FIG. 15).

The wedge calculation machine operates in accordance with the state transitions illustrated in the diagram of FIG. 20 and set forth in the following table. The input conditions illustrated in the table are logical tests of conditions, rather than operations on data.

| Transition Number | Input Conditions | Outputs |
|---|---|---|
| 1 | None | Sync = 0 |
| 2 | If (Sync = 1) | Wedge = 0; Current Sector = 0; Byte Count = 0; Carry Over = 0 |
| 3 | If (Sync = 0) | Wedge = 0; Current Sector = 0; Byte count = 0; Carry Over = 0; Starting Byte Count = 0; DFF Number = 0; Bytes Avail = Starting Bytes Avail. |
| 4 | If (Ref Servo Gate) AND (Current Sector ≠ Sectors Per Track) | Starting Byte Count = Byte Count; DFF Number = 0: Bytes Avail = Starting Bytes Avail. |
| 5 | If (NOT Ref Servo Gate) | None |
| 6 | If (Carry Over = 0) | DFF Size = DF Size |
| 7 | If (Carry Over ≠ 0) | DFF Size = Carry Over |
| 8 | None | Bytes Avail = Bytes Avail − DFF Size |
| 9 | If (Bytes Avail ≧ 0) | Bytes Avail = Bytes Avail − DF ECC Bytes |
| 10 | If (Bytes Avail < 0) | Carry Over = −Bytes Avail |
| 11 | If (Carry Over ≧ Min Bytes Per DFF) | Byte Count = Byte Count + DFF Size − Carry Over) |
| 12 | If (Carry Over < Min Bytes Per DFF) | Carry Over = Min Bytes Per DFF |
| 13 | None | Byte Count = Byte Count + (DFF Size − Carry Over) |
| 14 | If (bytes avail < 0) | Carry Over = Min Bytes Per DFF |
| 15 | If (bytes avail ≧ 0). | Byte Count = 0; Current Sector = Current Sector + 1 |
| 16 | If (Current Sector = Sectors Per Track) | Carry Over = 0 |
| 17 | If (Current Sector ≠ Sectors Per Track) | Bytes Avail = Bytes Avail − Intersector Gap |
| 18 | If (Bytes Avail < Min Bytes Per DFF) | Carry Over = 0 |
| 19 | If (Bytes Avail ≧ Min Bytes Per DFF) | DFF Number = DFF Number + 1; DFF Size = DF Size |
| 20 | If (Wedge = Current Wedge) | Ending Byte Count = Byte Count; Ending DFF = DFF Number; Sync = 1; Wedge = Wedge + 1 |
| 21 | If (Wedge ≠ Current Wedge) | Ending Byte Count = Byte Count; Ending DFF = DFF Number; Sync = 0; Wedge = Wedge + 1 |
| 22 | If (Wedge = Servos Per Track) | None |
| 23 | If (Wedge ≠ Servos Per Track) AND (Sync = 1) | None |
| 24 | If (Wedge ≠ Servos Per Track) AND (Sync = 0) AND (Current Sector = Sectors Per Track) | None |
| 25 | If (Wedge ≠ Servos Per Track) AND (Sync = 0) AND (Current Sector ≠ Sectors Per Track) | Starting Byte Count = Byte Count; DFF Number = 0; Bytes Avail = Starting Bytes Avail + 1 |
| 26 | If (Ref Servo Gate) AND (Current Sector = Sectors Per Track) | None |

At transition 1, when a new track is selected for data transfer, the state machine is started in an initial unsynchronized state, signified by the Sync flag equal to zero. The state machine enters the "Start at Wedge 0" state 250 to begin calculating the track layout.

If, at state 250, the Sync flag is equal to one, the state machine has synchronized itself to the disc. Under such conditions, the Wedge counter is reset to zero, thereby representing that the first logical wedge (the logical start of the track) will be the next wedge to pass the read/write head. Additionally the Current Sector counter is reset to zero representing the first logical sector on the track. The Byte Count register is reset to zero for the start of a new sector, and the Carry Over register is reset to zero to indicate the absence of a data field split across wedge 0. The state machine thus transitions at 2 from state 250 to the "Wait for Ref Servo Gate" state 252.

If, at state 250, the Sync flag is equal to zero, the state machine has not yet obtained synchronization to the disc. The Wedge counter and the Current Sector counter are reset to zero, representing the first logical wedge and the first logical sector on the track. The Byte Count register is reset to zero for the start of a new sector, and the Carry Over register is reset to zero to indicate the absence of a data field split across wedge 0. The Starting Byte Count register is reset to zero for the first wedge, since a new sector starts there. The DFF Number counter is reset to zero, and the Bytes Avail accumulator is loaded to the value in the Starting Bytes Avail register, since the calculation is at the start of a new wedge. The state machine transitions at 3 from state 250 to the "Start of Wedge" state 254.

The state machine exits the "Wait for Ref Servo Gate" state 252 when the leading edge of the Ref Servo Gate signal is detected, indicating the beginning of a wedge. If the Current Sector counter is not equal to the value in the Sectors Per Track register, the end of the track has not yet been reached. In preparation for the next wedge, the Starting Byte Count register is loaded to the value in the Byte Count register to signify the starting byte count in the first data field fragment of the upcoming wedge. The DFF Number counter is reset to zero, and the Bytes Avail accumulator is loaded to the value in the Starting Bytes Avail register, since the calculation is at the start of a new wedge. The state machine transitions at 4 from state 252 to the "Start of wedge" state 254.

At state 252, if the Ref Servo Gate signal is inactive, the state machine remains in the "Wait for Ref Servo Gate" state 252, as indicated at transition 5.

At state 254, to begin the calculation of the current wedge layout, the state machine initializes the DFF Size register for the first data field fragment of the wedge. If the Carry Over register is zero, the current wedge starts with a new sector, and the DFF Size register is loaded with the value in the DF Size register. The state Machine thus transitions at 6 from state 254 to the "End of Data Field Fragment" state 256. If the Carry Over register is non-zero, the current wedge starts with the remainder of a split sector, and the DFF Size register is loaded with the value in the Carry Over register, which represents the number of bytes remaining for the split sector. The state machine thus transitions at 7 from state 254 to the "End of Data Field Fragment" state 256.

At state 256, when the end of a data field fragment is reached in the wedge calculation, the state machine adjusts the Bytes Avail accumulator by subtracting the value in the DFF Size register. This subtraction may underflow the Bytes Avail accumulator. The state machine transitions at 8 from state 256 to the "Check for Split in Data Field" state 258.

At state 258, if the remaining value in the Bytes Avail accumulator is greater than or equal to zero, there may be room left in the wedge for the ECC bytes. The value in the DF ECC Bytes register is subtracted from the Bytes Avail accumulator, which may underflow the Bytes Avail accumulator. The state machine transitions at 9 from state 258 to the "Check for Split in ECC" state 260. If the remaining value in the Bytes Avail accumulator is less than zero, the current sector is split across the next servo spoke. The Carry Over register is loaded to the negative of the value in the Bytes Avail accumulator, which represents the number of bytes remaining for the split sector. The state machine transitions at 10 from state 258 to the "Check for Minimum Carry Over" state 270.

At state 270, a sector is split across the next servo spoke. If the value in the Carry-Over register is greater than or equal to the value in the Min Bytes Per DFF register, the split is valid, so the Byte Count register can be adjusted for the next wedge. The Byte Count register is incremented by the value in the DFF Size register minus the value in the Carry Over register. The state machine transitions at 11 from state 270 to the "End of Wedge" state 266. If the value in the Carry Over register is less than the value in the Min Bytes Per DFF register, the data field fragment following the next servo spoke is too small and needs to be adjusted to the minimum allowed value. The Carry Over register is loaded with the value in the Min Bytes Per DFF register. The state machine transitions at 12 from state 270 to the "Set Minimum Carry Over" state 272.

At state 272, with the minimum data field fragment size loaded into the Carry Over register for the beginning of the next wedge, the Byte Count register is incremented by the value in the DFF Size register minus the value in the Carry Over register. The state machine transitions at 13 from state 272 to the "End of Wedge" state 266.

As described above at state 260, the Bytes Avail register has been decremented by the value in the DF ECC Bytes register. If the result is less than zero, there is insufficient room at the end of the wedge for the ECC bytes, and a minimum number of bytes of the data field must be carried forward to the next wedge. The Carry Over register is loaded with the value in the Min Bytes Per DFF register. The state machine transitions at 14 from state 260 to the "Set Minimum Carry Over" state 272, where the conditions for transition 13 exist. If the result of the decrement of the Bytes Avail register by the value in the DF ECC Bytes register is greater than or equal to zero, the sector will fit successfully in the current wedge. Therefore, the Byte Count register is reset to zero for the start of the next sector, and the Current Sector counter is incremented. The state machine transitions at 15 from state 260 to the "End of Data Field" state 262.

At state 262, when the end of a sector has been reached in the wedge calculation, the state machine determines whether another sector will fit on the track. If the Current Sector counter equals the Sectors Per Track register, the calculation has reached the end of the track. The Carry Over register is reset to zero in preparation for the start of the track. The state machine transitions at 16 from state 262 to the "End of Wedge" state 266. If the Current Sector counter does not equal the Sectors Per Track register, there are one or more sectors on the track. The Bytes Avail Accumulator is decremented by the value in the Intersector Gap register, which may underflow the Bytes Avail accumulator. The state machine transitions at 17 from state 262 to the "Check Intersector Gap" state 264.

At state 264, if the Bytes Avail accumulator is less than the value in the Min Bytes Per DFF register, there is not sufficient room remaining in the current wedge for another data field fragment. Consequently, the Carry-Over register is reset to zero, indicating that the next wedge will begin with a new sector. The state machine transitions at 18 from state 264 to the "End of Wedge" state 266. If the Bytes Avail accumulator is greater than or equal to the value in the Min Bytes Per DFF register, there is enough room remaining in the current wedge for another data field fragment. Consequently, the DFF Number counter is incremented, indicting that another data field fragment fits in the current wedge. The DFF Size register is loaded with the value in the DF Size register, indicating that the desired size of the next data field fragment is a full sector size. The state machine transitions at 19 from state 264 to the "End of Data Field Fragment" state 256.

The state machine continues to calculate the sector layout, through transitions 8, 9, 15, 17 and 19 until the end of the wedge has been found at state 266. At state 266, if the Wedge counter equals the Current Wedge counter, the state machine is already or has become synchronized to the disc. Therefore, the Sync flag is set to one. The Ending Byte Count register is loaded with the value in the Byte Count register, signifying the byte position in the last data field fragment of the wedge at which a split occurs, if a split does occur. The Ending DFF register is loaded with the value in the DFF Number counter, signifying the data field fragment number of the last data field fragment in the wedge. The Wedge counter is incremented in preparation for the next wedge. The state machine transitions at 20 from state 266 to the "Set Sync State" state 268. If the Wedge counter does not equal the Current Wedge counter, the state machine has not yet obtained synchronization to the disc. Therefore, the Sync flag is maintained at zero. The Ending Byte Count register is loaded with the value in the Byte Count register, signifying the byte position in the last data field fragment of the wedge at which a split occurs, if a split does occur. The Ending DFF register is loaded with the value in the DFF Number counter, signifying the data field fragment number of the last data field fragment in the wedge. The Wedge counter is incremented in preparation for the next wedge. The state machine transitions at 21 from state 266 to the "Set Sync State" state 268.

At state 268, if the Wedge counter equals the value in the Servos Per Track register, the calculation has reached the end of the track. The state machine transitions at 22 from state 268 to the "Start at Wedge 0" state 250.

At state 268, if the Wedge counter does not equal the value in the Servos Per Track register, and the Sync flag is equal to one, the state machine is synchronized to the disc and must prepare to calculate the next wedge when it approaches the read/write head. The state machine transitions at 23 from state 268 to the "Wait for Ref Servo Gate" state 252. If the Wedge counter does not equal the value in the Servos Per Track register, and the Sync flag is equal to zero, and the Current Sector counter equals the value in the Sectors Per Track register, the state machine has reached the end of the track but is not yet synchronized to the disc. The state machine transitions at 24 from state 268 back to the "End of Wedge" state 266. If the Wedge counter does not equal the value in the Servos Per Track register, and the Sync flag is equal to zero, and the Current Sector counter does not equal the value in the Sectors Per Track register, the state machine has not yet obtained synchronization to the disc and has not reached the end of the track. The Starting Byte Count register is loaded with the value in the Byte Count register, signifying the starting byte count for the first data field fragment in the next wedge. The DFF Number counter is reset to zero, and the Bytes Avail accumulator is loaded to the value in the Starting Bytes Avail register, since the calculation is at the start of a new wedge. The state machine transitions at 25 from state 268 to the "Start of Wedge" state 254.

At state 252, the state machine exits the "Wait for Ref Servo Gate" state 252 when the leading edge of the Ref Servo Gate signal is detected. If the Current Sector counter equals the value in the Sectors Per Track register, the calculation has completed the last sector on the track, but one or more blank wedges exist at the end of the track. This situation may occur if a sector size is large relative to the number of bytes per track. The state machine transitions at 26 from state 252 to the "End of Wedge" state 266.

As described above, the typical servo spoke width is 10 microseconds or more. For a disc having a maximum of 16 data field fragments per data wedge, the worst-case time required for the wedge calculation machine to compute the parameters for one data wedge is based on the time required to reach and compute the sixteen data field fragments of the wedge. Starting from state 252 "wait for reference servo gate," the computation for the first data field fragment involves the sequence of transitions 4, 6 or 7, 8, 9, 15, 17 and 19. Thus, seven transitions are required to compute the parameters for the first data field fragment. The next fourteen data field fragments are computed by repeating the sequence starting at state 256 of transitions 8, 9, 15, 17 and 19, returning to state 256. Therefore, these fourteen data field fragments require five transitions each, resulting in 70 transitions for all fourteen fragments. Finally, the last data field fragment is computed by the worst-case sequence starting at state 256 of transitions 8, 9, 15, 17, 18, 20, 22 and 2, for a total of eight transitions. Hence, to compute the parameters for the entire data field wedge of sixteen data field fragments requires 85 transitions. For a state machine operating at 20 Megahertz, corresponding to a 50 nanosecond state time, 85 transitions equates to 4.25 microseconds. This amount of time is well within the typical 10 microseconds of the servo spoke. Thus, the state machine provides adequate margin for computing a worst-case data wedge prior to the end of the reference servo gate pulse.

When a new track is selected, the microprocessor must change the skew to servo counter logic 116 (FIG. 17) and restart the wedge calculation machine. Since the synchronization state is 0 or false when the state machine begins execution, the worst-case synchronization time for a random start up is the time required to compute the 60 data wedges on the track (255 microseconds) plus two data wedges that could have been passed during the 255 microsecond synchronization time for 60 wedges (8.5 microseconds). The worst-case synchronization time of 263.5 microseconds is significantly less than the typical single track seek time of about 1 millisecond. Consequently, synchronization time can be hidden by executing the state machine in parallel with the actuator movement for the seek or head change. Realistically, for a disc drive employing 512-byte sectors operating at a 200 Megabits per second (Mbps) disc transfer rate, no more than about eight data field fragments will fit in a single data wedge. Consequently, the worst-case synchronization delay is more realistically about 137.25 microseconds.

FIG. 21 is a block diagram of the state machine diagrammed in FIG. 20. However, FIG. 21 illustrates data paths only, and does not illustrate the control paths described above.

Disc interface controller 112 (FIG. 15) is configured differently from disc interface controller 68 of the prior art, shown in FIG. 8, and provides interface to headerless sector translation logic 114. Since logic 114 is primarily intended to be incorporated into the same integrated circuit as controller 112, connections can be added to the interface controller to implement the interface. Since the data and control paths are internal and private to one integrated circuit, headerless sector translation logic 114 imposes no additional circuit board layout constraints.

Disc interface controller 112 responds to the trailing edge of the servo gate signal from servo system 110 to check the state of the synchronization signal from headerless sector translation logic 114. If the synchronization signal is false (0), the disc interface controller waits for the next data wedge to check the synchronization signal again. A true (1) synchronization signal indicates the headerless sector translation logic 114 is presenting valid data to the disc interface controller. Thus, all inputs are latched in the disc interface controller at the beginning of the data wedge.

Disc interface controller 112 includes a byte counter (not shown) for counting the data fields and a data field fragment counter (not shown) for counting the data field fragments. At the beginning of a data wedge, and after verification that the synchronization signal is true, disc interface controller 112 will search for the target sector. The beginning of the target sector is identified when headerless sector translation logic 114 presents a starting byte count signal of zero, an identification match status of true and a sector reassigned status of false. When this combination of signals is detected by controller 112, the controller may begin transfer of data to or from the target sector. At the end of the sector, controller 112 sends an increment current sector pulse and an increment target sector pulse to headerless sector translation logic 114 to increment the current sector identification and the target sector number.

If the conditions for transferring the target sector do not exist, disc interface controller 112 skips to the next data field fragment. After skipping a sector and incrementing the current sector identification, controller 112 checks the identification match status to again determine whether to skip the next sector or transfer data with it.

When the count in the data field fragment counter of controller 112 reaches the ending data field fragment count, and the byte counter in controller 112 reaches the ending byte count, the end of the data wedge has been reached, and controller 112 must wait through the next servo gate pulse from servo system 110 bridging the servo spoke.

When controller 112 reaches the end of the sector which it has skipped or transferred, it must also check the end of track status from headerless sector translation logic 114. If the end of track status is true, controller 112 performs or initiates a track change operation, as required by the host system. When controller 112 reaches the end of a sector which it has transferred, it sends both an increment current sector pulse and an increment target sector pulse to headerless sector translation logic 114. Before transferring the next sector, controller 112 again checks the identification match status. If the headerless sector translation logic has detected that the next sector is defective with a status of "skipped," logic 114 increments the target sector identification and the identification match will become false. If the identification match status is false, controller 112 sends an increment current sector pulse to headerless sector translation logic 114 and waits for the next sector. If the identification match becomes true, the controller executes a data transfer.

If the headerless sector translation logic 114 detects that a target sector is defective with a "reassigned" status, it asserts the sector reassigned status to the disc interface controller 112. A sector reassigned status signal to controller 112 forces the controller to interrupt data transfer and prepare necessary operations for recovering an alternate sector. Recovery is controlled by the microprocessor and involves searching an alternative sector table. Often, the alternate sector is on another track, and the disc interface controller initiates a change of track function, requiring resynchronization to the new track as previously described.

Figure 22:
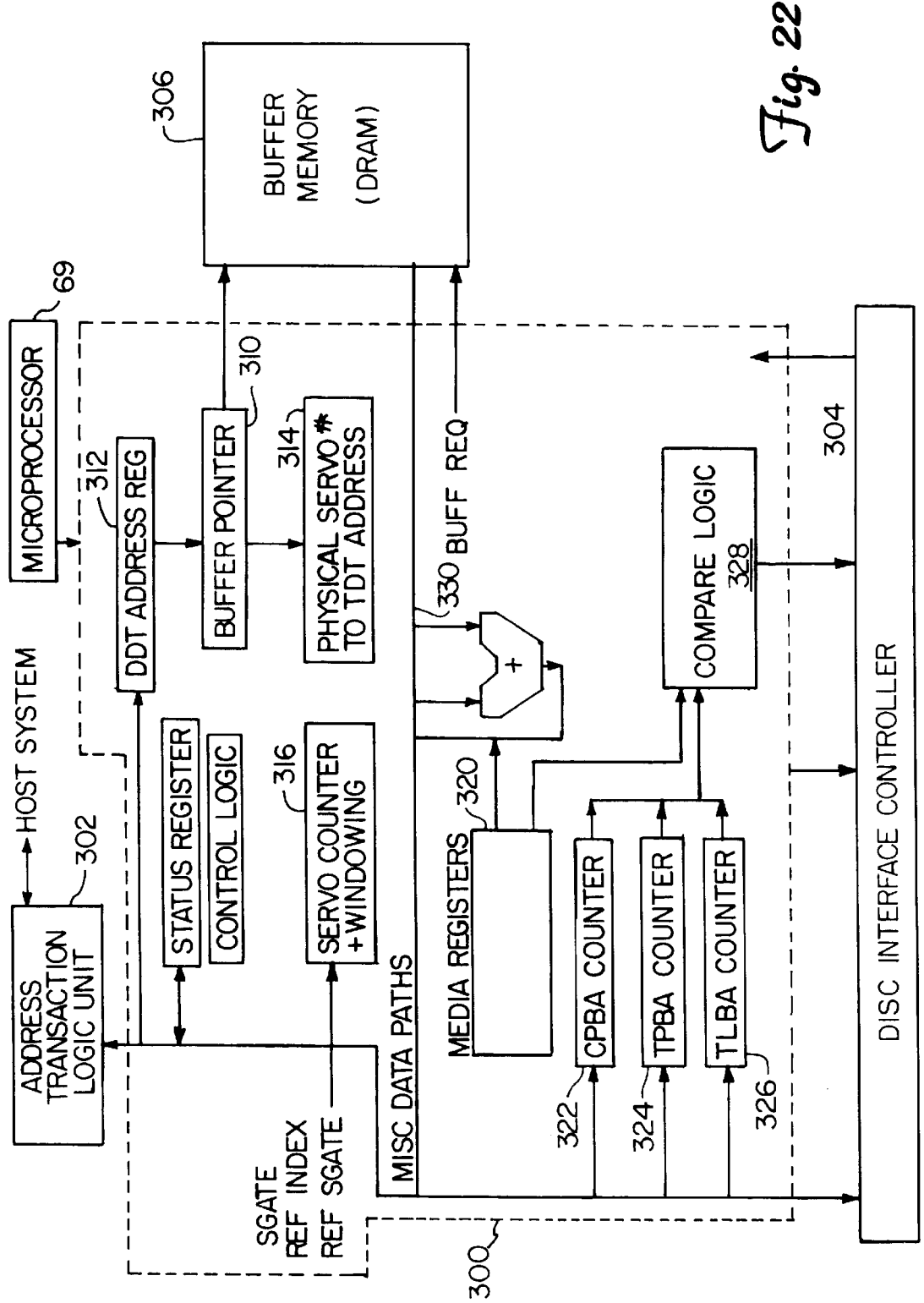
FIG. 22 is a block diagram of a media manager having a track description table for a read/write system for a disc drive employing the format of FIG. 10 in accordance with another embodiment of the present invention.

The headerless sector translation logic 114 illustrated in FIG. 15 is a dynamic system that formats data wedges of a track on the fly. More particularly, the state machine in FIG. 21 operates in two modes, a track synchronization mode and a wedge calculation mode. In the track synchronization mode, the machine obtains circumferential synchronization to the target track during actuator movement to that track. In the prior art, the disc interface controller had to wait for the index signal from the first servo spoke of a track before it could obtain synchronization. In the present invention, synchronization can commence immediately upon initiation of actuator movement to the destination track. In the wedge calculation mode, the machine calculates the layout of each successive data wedge of the track in real time. FIG. 22 illustrates an alternative embodiment in which a track description table is employed in a memory and is used to provide the layout of the data wedges. Thus, FIG. 22 illustrates a media manager 300 connected through address translation logic unit 302 which in turn is connected to the processor and host system, such as through data interface controller 68 shown in FIG. 8. Connection of the media manager through the address translation logic unit permits identification, defect management and track boundary data to be configured directly by the controller hardware. The system shown in FIG. 22 is particularly useful with Advanced Technology (AT) systems, but it is useful with controllers employing other technologies as well.

Media manager 300 is also connected to disc interface controller 304 and to buffer memory 306. Media manager 300 is also connected to microprocessor 69. Memory 306 is preferably a random access memory such as a DRAM, but could be any other type of memory. Media manager 300 includes buffer pointer 310 arranged to select an address in memory 306. Pointer 310 receives input from defect description table address register 312 and from track description address register 314 to select an entry from memory 306. Servo counter 316 receives the servo gate, reference index and reference servo gate signals from servo system 110 (FIG. 8) and provides windowing logic to detect and flag improper alignment of the servo (Sgate) and index signals, as well as to provide the data to track description address logic 314. Track description address logic 314 includes a converter that converts the physical servo number to the logical servo number (see FIG. 17) and logic to translate the logical servo number to a track description table address for provision to pointer 310.

Address translation logic 302 provides input to defect description table address register 312 for input to pointer 310. Pointer 310 points to an address in memory 306 to load defective sector address data into media management registers 320. Media management registers 320 hold various data and counts to be described. Counters 322, 324 and 326 receive input from the address translation logic unit 302 and provide the current physical block address, target physical block address and target logical block address, respectively, to compare logic 328. Disc interface controller 304 receives track description table information from memory 306 and identification match, end of track and orientation data signals from media manager 300. Address translation logic 302 is described in greater detail in two U.S. patent applications Ser. Nos. 08/485,988 and 08/485,989 each for "Autonomous High Speed Address Translation with Defect Management for Hard Disc Drives" by Sean R. Atsatt et al. and each filed on even date herewith, which applications are incorporated herein by reference.

In operation, track description address logic 314 receives data from servo counter 316 to identify the physical sector number. Logic 314 addresses the track description table in memory 306 to select the layout information for the current wedge. The data format is output via data bus 330 to disc interface controller 304. Thus, media manager 300 fetches the appropriate track description table data from memory 306 and loads them into disc interface controller 304 during the servo spoke. Transfer occurs without impacting available buffer bandwidth. Initially, two servo fields are required before the media manager becomes oriented. On each fetch, the last fragment split descriptor in the data is added to a sequencer overhead register value in media registers 320 and held in a byte counter holding register of the media registers 320.

Counters 322, 324, and 326 maintain the current physical block address, the target physical block address and the target logical block address, respectively. Media manager 300 reloads current physical block address counter 322 during each servo spoke with the sum of the track starting physical block address and the physical block displacement value obtained from the track description table during the servo spoke. Thus, the current physical block address 322 is set at the start of each servo. Between servo spokes, disc interface controller 304 controls media manager 300 to increment the target physical block address, the target logical block address and the current physical block address. If the current physical block address is equal to the target physical block address, there is an identification match. An end of track condition occurs when the current physical block address matches the last target physical block address of the track.

The initial target physical block address is loaded into the media manager by either address translation logic unit 302 or microprocessor 69 before the transfer begins. Media manager 300 informs disc interface controller 304 of the identification match and the disc interface controller transfers data appropriately.

FIG. 23 illustrates the layout of the track description table stored in memory 306. The track description table defines the physical layout for each track for each zone. As described above, although the data wedges within a given track may be unique to all other data wedges of that track, each track within a single recording zone has a format identical to each other track in that zone. FIG. 23 shows the arrangement of one track description table entry, which defines the layout of one data wedge. Each table entry is defined in four 8-bit bytes. Hence, a recording zone for a disc drive having 64 servo spokes requires 256 bytes in the track description table. The four bytes shown in FIG. 23 for a single data wedge comprise a last fragment split descriptor (10 bits), a last data fragment count (4 bits) and a starting physical block displacement (12 bits). Additionally, there is a six-bit field reserved for future expansion, such as if the number of data fields or data fragments exceeds 16 in any given wedge.

The last fragment split descriptor is the byte count value defining the split point of the last data fragment in the wedge. This is used to determine the byte count at which the sector should be split. For a last data fragment that ends a data field, the value loaded in this field is 1024 minus the sequencer overhead to complete a data fragment after a byte counter match. This causes the byte counter to automatically roll to zero to start the next data field.

The last data fragment count is the data fragment number of the last data fragment in the corresponding wedge. This is used to identify the data field fragment that ends the data wedge and in which fragment the next servo spoke occurs. The starting physical block displacement is the sector offset from the logical start of the track. The starting physical block displacement is zero-based and is used by the controller to determine the physical block address of the sector that is following or split by the servo spoke. Additionally, a predetermined value of the starting physical block displacement indicates that the wedge is unused.

For a disc drive with 64 spokes, the 256-byte track description defines the layout of data wedges of each track within a single recording zone. Since multiple recording zones exist on the disc, memory 306 may comprise as much as 5K of memory for the track description table. Each 256-byte track description defines the layout of all of the data wedges of a single track.

FIG. 24 illustrates the layout of the defect description table also stored in memory 306. The defect description table is accessed by the defect description table address register 312, in a manner similar to that described above. The defect description table comprises eight 8-bit bytes for each defect entry and permits the controller hardware to calculate the physical block address for a given logical block address. It also permits detection and skipping of defective sectors during data transfer, detection of the last user physical block address in a recording zone, and detection of and halting on reassigned sectors. The defect description table performs the defect management previously accomplished by the header in the sectors of discs.

The 16-bit (2-byte) most significant word of each entry of the defect description table comprises 10 bits reserved (such as for use by the firmware as an index for alternate physical block address entries), a status bit, and a 5-bit zone field. The zone field defines the recording zone in which the logical block address for the entry is located.

The status bit identifies the status of the entry. When the status bit is zero, status for the entry is "good," whereas when the status bit is one, the status for the entry is "reassigned." Defective sector location information is inferred from the defect description table. The defect description table contains an entry for the good or reassigned sector immediately following each defective or spare sector or each group of consecutive defective or spare sectors. Noteworthy, by identifying the first good or reassigned sector following a group of defective or spare sectors, there may be any number of defective or spare sectors in a group of consecutive defective or spare sectors. There is also an entry for the first good or reassigned sector of each zone.

The least significant word is a 6-byte, 48-bit word having one bit reserved for future use by the firmware, for example for alternate physical block address entries. A 15-bit slip field defines the number of sectors that have been mapped out or spared from the starting address on the disc to the respective logical block address in the table entry. The slip field accounts for all sectors that are defective and skipped, as well as spared, that appear before the respective logical block address. Since the physical block address is equal to the logical block address plus the slip, the media manager is able to maintain correlation between the logical block address and the physical block address. Finally, a 32-bit logical block address identifies the unique user sector address. For defective sectors, the logical block address is associated to the next good or reassigned sector following the defective sector or group of consecutive defective sectors. For a defect description table entry identifying a zone boundary, the logical block address value is equal to the first good or reassigned sector of the zone. For a reassigned sector, the logical block address of the defect description table entry is equal to the logical block address of the reassigned sector.

In operation, the next skipped physical block address is calculated from the data taken from the defect description table. At the start of a transfer, media manager 300 is provided with the address in memory 306 that corresponds to the defect description table entry nearest, but not before, the target logical block address. The address is provided either by address translation logic 302 or by microprocessor 69. Media manager 300 increments the address and fetches the next defect description table entry as necessary. The next skipped physical block address and the next good physical block address are calculated and stored.

When skipped sectors are detected, the media manager loads the target physical block address with the next good physical block address when the target physical block address is equal to the next skipped physical block address. Thus, the target physical block address is pushed beyond the skipped sectors. The identification match is no longer true, so the sequencer stops transferring sectors until the current physical block address catches up to the target physical block address. In this manner, defective sectors are skipped.

A reassigned sector is detected when the next skipped physical block address is equal to the target physical block address and the corresponding defect description table entry's status bit is true. Media manager 300 asserts the reassigned signal to the disc interface controller and becomes idle when a reassigned sector is detected. When a reassigned sector is detected, the media manager does not fetch the next defect description table entry from memory 306.

Media manager 300 also monitors the next track start physical block address, which detects the end of a track. Media manager also monitors the next region start logical block address, which indicates the last user logical block address in a sparing region. The next track start physical block address and the next region start logical block address are initialized by the address translation logic unit 302 or microprocessor 69. Media manager 300 continuously compares the next track start physical block address to the target physical block address from counter 324 and the next region start logical block address to the target logical block address in counter 326. If the target physical block address is greater than or equal to the next track start physical block address or if the target logical block address is equal to the next region start logical block address, the end of track flag becomes true, signaling the end of track to the disc interface controller 304.

It will be appreciated that the defect description table shown in FIG. 24 differs from the defect management table described in the earlier embodiments. In the earlier embodiments, the table included entries for each defective sector of two tracks. In FIG. 24, defect management information is provided in one table for all of the defective and skipped sectors for all of the tracks on the disc drive. Thus, instead of loading and unloading defect management data from the microprocessor, as in the earlier embodiments, the embodiment of FIG. 24 employs a single table containing all defect management data. This reduces the amount of data transfer during track seek operations. Additionally, the defect management table of FIG. 24 includes an entry representing the start of each recording zone. These entries are useful for address translation purposes.

Although the present invention has been described with reference to preferred embodiments, workers skilled in the art will recognize that changes may be made in form and detail without departing from the spirit and scope of the invention.

What is claimed is:

1. A method of managing transfer of data between a processor and transducer confronting a rotatable recording disc having a plurality of concentric data tracks arranged in a plurality of servo spokes and a plurality of data wedges separated by respective servo spokes, each data wedge containing a plurality of data sectors, the transducer being operable to transfer data between the respective data sector and a host system, at least some data sectors being split by a servo spoke into fragments such that respective fragments of a split data sector are in different data wedges, each track having a format characterized by an absence of sector identification and defect management data, each servo spoke providing a servo gate signal, the transducer confronting the disc and operable to transfer data between a sector of a selected track confronting the transducer and the processor, at least some data sectors on the disc being defective sectors, the method comprising:

a) providing a defect bank identifying sectors containing defects on the selected track of the disc confronting the transducer;

b) identifying the selected track;
 c) identifying the data sector currently confronting the transducer by
  i) identifying the number of bytes in each data wedge on the selected track of the disc,
  ii) continuously incrementing a count of bytes through that data wedge containing the data sector currently confronting the transducer,
  iii) incrementing a count of data sectors on the selected track,
  iv) calculating the layout of data sectors in the data wedge containing the data sector currently confronting the transducer based on the identification of the selected track confronting the transducer, the data sector count and the byte count, and
  v) identifying the data sector currently confronting the transducer based on the calculated wedge layout and the data sector count;
 d) identifying a sector of the track matching a sector identified in the defect bank;
 e) inhibiting transfer of data between the processor and the transducer if the data sector currently confronting the transducer matches a sector identified by the defect bank; and
 f) resetting the byte count when the byte count matches the identified number of bytes in the data wedge.

2. The method of claim 1 including skipping data transfer with the data sector of the disc confronting the transducer or generating an interrupt signal to the processor if the data sector currently confronting the transducer matches a sector identified by the defect bank.

3. The method of claim 1, further including repeating steps c), d) and e) when data are read from the next successive data sector.

4. The method of claim 1, wherein the defect bank further contains defect management data associated with defective sectors, the management data including at least one status bit, the method further including, if the data sector currently confronting the transducer matches a sector identified by the defect bank, skipping data transfer with the data sector of the disc confronting the transducer in response to a first status bit state or generating an interrupt signal to the processor in response to a second status bit state.

5. The method of claim 4, wherein there is one status bit having first and second states.

6. The method of claim 4, wherein the status bit includes a reassigned state, the method further including generating the interrupt signal in response to a reassigned state, the processor being responsive to the interrupt signal to halt transfer of data between the processor and the transducer while the transducer confronts the data sector matching the sector identified by the defect bank and to initiate transfer of data with an alternate track and data sector.

7. The method of claim 6, wherein the status bit includes a skipped state and skipping the data sector identified by the defect bank to transfer data with a successive data sector.

8. The method of claim 1, wherein the defect bank contains defect management data comprises identification of non-defective sectors, the method further including sequencing defect management data for successive sectors and operating the processor to transfer data between the processor and the transducer when the transducer confronts a data sector identified by the sequencing means and to skip data sectors not identified by the defect management data.

9. The method of claim 8, wherein the defect management data further includes reassignment information, the method further including operating the processor to seek another data sector in response to the reassignment information.

10. Apparatus for inhibiting data transfer between a processor and a transducer confronting a rotatable recording disc having a plurality of concentric data tracks arranged in a plurality of servo spokes and a plurality of data wedges separated by respective servo spokes, each data wedge containing a plurality of data sectors, at least some data sectors being split by a servo spoke into fragments such that respective fragments of a data sector are in different data wedges, each track being characterized by an absence of sector identification and sector defect data, each servo spoke providing a servo gate signal, the transducer confronting the disc and operable to transfer data between a sector of the track confronting the transducer and the processor, the apparatus comprising:

a defect bank identifying defective sectors in at least the track of the disc confronting the transducer;

means identifying the number of bytes in each data wedge on each track of the disc;

track management apparatus for identifying the layout of data sectors on a selected track, the track management apparatus including a first counter for incrementing through a count of bytes in a current data wedge containing the data sector confronting the transducer, a second counter, responsive to the first counter identifying a count equal to the number of bytes in a data sectors, to increment a count of data sectors on the track, and wedge calculation apparatus responsive to the data sector count and to the byte count to calculate the layout of data sectors in the current data wedge;

compare logic operable in response to the wedge calculation apparatus to identify the data sector currently confronting the transducer; and defect management apparatus connected to the defect bank and the compare logic and operable to inhibit transfer of data between the processor and the transducer when the sector identified by the compare logic is a defective sector identified by the defect bank.

11. Apparatus as in claim 10, wherein the defect bank contains information representative of the identification of defective sectors and at least one status bit associated with each defective sector, the defect management apparatus being operable in response to the data sector identified by the compare logic being a defective sector identified by the defect bank to either skip data transfer with the data sector confronting the transducer in response to a first status bit state or to generate an interrupt signal to the processor in response to a second status bit state.

12. Apparatus as in claim 10, wherein the defect bank includes a plurality of addressable locations, a defect pointer counter containing an address of a location in the defect bank, a defect management apparatus being operable to increment the defect pointer counter to address successive locations in the defect bank corresponding to defective sectors in a list of defective sectors, the defect management apparatus being operable to inhibit transfer of data in response to a match of the identification of the data sector at the location addressed by the defect pointer counter to the sector identified by the data sector logic.

13. Apparatus as in claim 12, including a defect list start register containing an address of a location in the defect bank corresponding to the start of the list of defective sectors, and a defect list end register containing an address of a location in the defect bank corresponding to the end of the list of defective sectors.

14. Apparatus as in claim 10, including a search sector counter containing an identification of a data sector of the disc with which data transfer is intended, the compare logic comparing the sector identification in the search sector counter and the servo data to identify that the data sector currently confronting the transducer is the data sector with which data transfer is intended.

15. Apparatus as in claim 14, wherein the defect bank includes a plurality of addressable locations containing information representative of the identification of defective sectors, the apparatus including a defect pointer counter containing an address of a location in the defect bank, the defect management apparatus being operable to increment the defect pointer counter to address successive locations in the defect bank, the defect management apparatus being operable to inhibit transfer of data in response to a match of the identification of the data sector at the location addressed by the defect sector pointer counter to the data sector identified by the compare logic.

16. Apparatus as in claim 15, wherein the defect bank contains defect management data associated with the identification of defective sectors in the defect bank, the defect management apparatus being responsive to the defect management data to skip a defective data sector confronting the transducer or initiate an interrupt signal to the processor.

17. Apparatus as in claim 10, wherein the defect bank contains information representative of the identification of defective sectors for at least two tracks, the defect management apparatus being operable to read defect information associated with the track currently confronting the transducer from the defect bank, and the defect bank being operable to transfer defect information associated with both tracks with a processor.

18. Apparatus as in claim 10, wherein the defect bank contains information representative of the identification of non-defective sectors, the defect management apparatus including sequence means for sequencing through defect information and operating the processor to transfer data between the processor and the transducer when the transducer confronts a data sector identified by the sequencing means and to skip data sectors not identified by the sequencing means.

19. Apparatus as in claim 18, wherein the defect information further includes reassignment information, the sequence means being responsive to the reassignment information to operate the processor to seek another data sector.

20. Apparatus as in claim 18, wherein the defect bank contains defect information for each of the plurality of tracks.

21. The method as in claim 1, wherein calculating the wedge layout includes defining a predetermined minimum number of bytes permissible in a data sector fragment, identifying the number of bytes of a data sector to be carried over from a fragment of the data sector at the end of the current wedge to a fragment of the data sector at the beginning of the next wedge based on the byte count of the first counter and the number of bytes in the wedge, and reducing the number of bytes in the fragment at the end of the current wedge if the number of bytes to be carried over is greater than zero and less than the predetermined minimum number.

22. The method as in claim 21, wherein calculating the wedge layout is based on the data sector count and the carried over byte count from data sector fragment at the end of the previous data wedge.

23. The method as in claim 1, wherein at least one of the servo spokes provides an index identifying the beginning of a track, the method further including counting servo spokes, resetting the servo spoke count upon counting all of the servo spokes on a track, and resetting the servo spoke count if the servo spoke count is not a predetermined number upon detection of an index.

24. Apparatus as in claim 10, wherein the wedge calculation apparatus includes threshold means defining a predetermined minimum number of bytes permissible in a data sector fragment, compare means responsive to the byte count of the first counter and to the number of bytes in the wedge to identify the number of bytes of a data sector to be carried over from a fragment of the data sector at the end of the current wedge to a fragment of the data sector at the beginning of the next wedge, and adjustment means for reducing the number of bytes in the fragment at the end of the current wedge if the number of bytes to be carried over is greater than zero and less than the predetermined minimum number.

25. Disc drive apparatus as in claim 24, wherein the wedge calculation apparatus is responsive to the data sector count and to the carried over byte count from data sector fragment at the end of a previous data wedge to calculate the layout of data sectors in the current wedge.

26. Disc drive apparatus as in claim 24, wherein the first counter is reset in response to a servo gate signal and wherein the first counter is responsive to the servo gate signal and to the compare means to initialize the byte count at the beginning of a wedge equal to the carried over byte count.

27. Disc drive apparatus as in claim 10, wherein at least one of the servo spokes provides an index identifying the beginning of a track, the track management apparatus further includes a third counter responsive to servo gate signals for counting servo spokes, the third counter resetting its count at a predetermined number equal to the number of servo spokes on a track, and logic means indicating an out-of-synchronization condition if the count of the third counter is not reset upon detection of an index.

28. Disc drive apparatus as in claim 27, wherein the third counter is reset when the logic means indicates an out-of-synchronization condition.

29. Apparatus as in claim 10, wherein the defect management apparatus includes a compare apparatus responsive to the identification of the data sector currently confronting the transducer and an identification of a defective sector to identify whether the data sector currently confronting the transducer is a defective sector, and inhibit means responsive to the compare apparatus identifying that the data sector currently confronting the transducer is a defective sector for inhibiting data transfer between the transducer and the processor.

30. Apparatus as in claim 29, wherein the inhibit means is responsive to a match between the data sector of the track with which data are to be transferred, the identification of the data sector currently confronting the transducer, and the defect identification addressed by the defect pointer counter, to inhibit data transfer.

* * * * *